US011899395B2

(12) United States Patent
Kamikura et al.

(10) Patent No.: US 11,899,395 B2
(45) **Date of Patent: *Feb. 13, 2024**

(54) TONER

(71) Applicant: CANON KABUSHIKI KAISHA, Tokyo (JP)

(72) Inventors: Kenta Kamikura, Yokohama (JP); Takashi Kenmoku, Mishima (JP); Noritaka Toyoizumi, Mishima (JP); Akane Masumoto, Suntou-gun (JP); Yuzo Seino, Gotemba (JP); Yu Yoshida, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/053,846

(22) Filed: Nov. 9, 2022

(65) Prior Publication Data

US 2023/0080900 A1 Mar. 16, 2023

Related U.S. Application Data

(63) Continuation of application No. 16/935,263, filed on Jul. 22, 2020, now Pat. No. 11,531,282.

(51) Int. Cl.

| | |
|---|---|
| ***G03G 9/097*** | (2006.01) |
| ***G03G 9/08*** | (2006.01) |
| ***G03G 9/087*** | (2006.01) |

(52) U.S. Cl.

CPC ......... *G03G 9/0825* (2013.01); *G03G 9/0821* (2013.01); *G03G 9/08773* (2013.01); *G03G 9/09708* (2013.01)

(58) Field of Classification Search

CPC ............. G03G 9/0825; G03G 9/08773; G03G 9/09708

See application file for complete search history.

(56) References Cited

U.S. PATENT DOCUMENTS

| | | | |
|---|---|---|---|
| 6,777,153 | B2 | 8/2004 | Yano et al. |
| 6,808,907 | B2 | 10/2004 | Honma et al. |
| 6,908,721 | B2 | 6/2005 | Kenmoku et al. |
| 6,911,520 | B2 | 6/2005 | Fukui et al. |
| 7,045,321 | B2 | 5/2006 | Imamura et al. |
| 7,393,912 | B2 | 7/2008 | Mihara et al. |

(Continued)

FOREIGN PATENT DOCUMENTS

| | | | |
|---|---|---|---|
| CN | 108873633 | A | 11/2018 |
| EP | 2860584 | A1 | 4/2015 |

(Continued)

OTHER PUBLICATIONS

"Chemical Handbook, Basic Edition", revised 5th edition, edited by The Chemical Society of Japan (2004) (Maruzen Publishing) (table on the back of the front cover).

*Primary Examiner* — Peter L Vajda

(74) *Attorney, Agent, or Firm* — VENABLE LLP

(57) ABSTRACT

A toner comprising a toner particle, wherein the toner particle includes a toner base particle containing a binder resin and includes a protruded portion on a surface of the toner base particle; the protruded portion comprises an organosilicon polymer and a polyhydric acid metal salt; and the polyhydric acid metal salt is present on a surface of the protruded portion.

14 Claims, 2 Drawing Sheets

(56) References Cited

U.S. PATENT DOCUMENTS

| | | | |
|---|---|---|---|
| 7,399,568 | B2 | 7/2008 | Fukui et al. |
| 7,408,017 | B2 | 8/2008 | Imamura et al. |
| 7,452,960 | B2 | 11/2008 | Yano et al. |
| 7,510,813 | B2 | 3/2009 | Yano et al. |
| 7,638,194 | B2 | 12/2009 | Fukui et al. |
| 7,638,590 | B2 | 12/2009 | Fukui et al. |
| 7,682,765 | B2 | 3/2010 | Sugawa et al. |
| 7,795,363 | B2 | 9/2010 | Fukui et al. |
| 7,935,771 | B2 | 5/2011 | Fukui et al. |
| 8,067,136 | B2 | 11/2011 | Yano et al. |
| 8,093,342 | B2 | 1/2012 | Minami et al. |
| 8,110,329 | B2 | 2/2012 | Tominaga et al. |
| 8,178,271 | B2 | 5/2012 | Fukui et al. |
| 8,383,312 | B2 | 2/2013 | Fujimoto et al. |
| 8,574,801 | B2 | 11/2013 | Itabashi et al. |
| 8,609,312 | B2 | 12/2013 | Itabashi et al. |
| 8,828,633 | B2 | 9/2014 | Itabashi et al. |
| 8,828,639 | B2 | 9/2014 | Kamikura et al. |
| 9,029,056 | B2 | 5/2015 | Kenmoku et al. |
| 9,098,002 | B2 | 8/2015 | Kenmoku et al. |
| 9,098,003 | B2 | 8/2015 | Masumoto et al. |
| 9,158,216 | B2 | 10/2015 | Shimano et al. |
| 9,377,705 | B2 | 6/2016 | Shimano et al. |
| 9,383,668 | B2 | 7/2016 | Noji et al. |
| 9,423,708 | B2 | 8/2016 | Tominaga et al. |
| 9,423,714 | B2 | 8/2016 | Kenmoku et al. |
| 9,575,424 | B2 | 2/2017 | Nakagawa et al. |
| 9,599,919 | B2 | 3/2017 | Isono et al. |
| 9,658,554 | B2 | 5/2017 | Kinumatsu et al. |
| 9,720,340 | B2 | 8/2017 | Tominaga et al. |
| 9,733,584 | B2 | 8/2017 | Masumoto et al. |
| 9,785,071 | B2 | 10/2017 | Shimano et al. |
| 9,798,256 | B2 | 10/2017 | Kosaki et al. |
| 9,798,262 | B2 | 10/2017 | Toyoizumi et al. |
| 9,811,016 | B2 | 11/2017 | Aoki et al. |
| 9,823,595 | B2 | 11/2017 | Toyoizumi et al. |
| 9,829,814 | B2 | 11/2017 | Yoshida et al. |
| 9,829,816 | B2 | 11/2017 | Tanaka et al. |
| 9,829,820 | B2 | 11/2017 | Masumoto et al. |
| 9,835,964 | B2 | 12/2017 | Yoshida et al. |
| 9,857,711 | B2 | 1/2018 | Yoshida et al. |
| 9,857,713 | B2 | 1/2018 | Kosaki et al. |
| 9,869,943 | B2 | 1/2018 | Aoki et al. |
| 9,880,478 | B2 | 1/2018 | Shimano et al. |
| 9,897,932 | B2 | 2/2018 | Hotta et al. |
| 9,897,933 | B2 | 2/2018 | Yoshida et al. |
| 9,952,523 | B2 | 4/2018 | Shimano et al. |
| 9,964,879 | B2 | 5/2018 | Terui et al. |
| 10,012,922 | B2 | 7/2018 | Yoshida et al. |
| 10,078,285 | B2 | 9/2018 | Kubo et al. |
| 10,114,303 | B2 | 10/2018 | Katsura et al. |
| 10,295,920 | B2 | 5/2019 | Nishikawa et al. |
| 10,295,922 | B2 | 5/2019 | Terui et al. |
| 10,303,074 | B2 | 5/2019 | Yamawaki et al. |
| 10,303,075 | B2 | 5/2019 | Tanaka et al. |
| 10,310,396 | B2 | 6/2019 | Kamikura et al. |
| 10,338,487 | B2 | 7/2019 | Kamikura et al. |
| 10,345,726 | B2 | 7/2019 | Nakamura et al. |
| 10,353,308 | B2 | 7/2019 | Hatakeyama et al. |
| 10,401,750 | B2 | 9/2019 | Nakamura et al. |
| 10,409,180 | B2 | 9/2019 | Koji et al. |
| 10,429,757 | B2 | 10/2019 | Yoshida et al. |
| 10,503,090 | B2 | 12/2019 | Tominaga et al. |
| 10,539,893 | B2 | 1/2020 | Tanaka et al. |
| 10,539,899 | B2 | 1/2020 | Nakamura et al. |
| 10,545,422 | B2 | 1/2020 | Yamawaki et al. |
| 10,551,758 | B2 | 2/2020 | Tanaka et al. |
| 10,635,010 | B2 | 4/2020 | Kamikura et al. |
| 10,732,530 | B2 | 8/2020 | Matsui et al. |
| 10,747,136 | B2 | 8/2020 | Kenmoku et al. |
| 11,169,458 | B2 | 11/2021 | Toyoizumi et al. |
| 11,175,600 | B2 | 11/2021 | Uchiyama et al. |
| 11,256,187 | B2 | 2/2022 | Ogaki et al. |
| 11,314,178 | B2 | 4/2022 | Kenmoku et al. |
| 11,347,157 | B2 | 5/2022 | Kamikura et al. |
| 11,531,282 | B2 * | 12/2022 | Kamikura .......... G03G 9/09775 |
| 2005/0054063 | A1 | 3/2005 | Honma et al. |
| 2005/0260514 | A1 | 11/2005 | Mihara et al. |
| 2006/0194071 | A1 | 8/2006 | Yano et al. |
| 2007/0117945 | A1 | 5/2007 | Minami et al. |
| 2007/0275317 | A1 | 11/2007 | Fujimoto et al. |
| 2012/0172562 | A1 | 7/2012 | Kenmoku et al. |
| 2013/0065174 | A1 | 3/2013 | Itabashi et al. |
| 2015/0099224 | A1 | 4/2015 | Abe |
| 2015/0378274 | A1 | 12/2015 | Abe |
| 2015/0378275 | A1 | 12/2015 | Abe et al. |
| 2016/0299446 | A1 | 10/2016 | Kuroki et al. |
| 2017/0329246 | A1 | 11/2017 | Yamawaki |
| 2018/0210361 | A1 | 7/2018 | Katsura et al. |
| 2018/0329324 | A1 | 11/2018 | Kamikura |
| 2018/0329328 | A1 | 11/2018 | Tanaka et al. |
| 2019/0235404 | A1 | 8/2019 | Kamikura et al. |
| 2019/0271926 | A1 | 9/2019 | Kamikura et al. |
| 2019/0384197 | A1 | 12/2019 | Aoki et al. |
| 2019/0384200 | A1 | 12/2019 | Kamikura et al. |
| 2020/0225597 | A1 | 7/2020 | Chiba |
| 2020/0356019 | A1 | 11/2020 | Matsui et al. |

FOREIGN PATENT DOCUMENTS

| | | | |
|---|---|---|---|
| JP | 2001-209207 | A | 8/2001 |
| JP | 2016-21041 | A | 2/2016 |
| JP | 2016-27399 | A | 2/2016 |
| JP | 2017-203888 | A | 11/2017 |
| JP | 2017-203890 | A | 11/2017 |
| JP | 2017-207746 | A | 11/2017 |
| JP | 2018-194833 | A | 12/2018 |
| WO | 2019/065730 | A1 | 4/2019 |

* cited by examiner

TONER

BACKGROUND OF THE INVENTION

Field of the Invention

The present invention relates to a toner used in recording methods that utilize an electrophotographic method, electrostatic recording method, or a toner jet system recording method.

Description of the Related Art

The sectors that use electrophotographic-based image formation have become diversified in recent years from printers and copiers to commercial printing machines. This has been accompanied by continuing increases in the image quality required of electrophotography.

Within this context, faithful reproduction of the latent image is required of the toner. Precision control of toner charge is effective for providing faithful reproduction of the latent image. An inadequate control of toner charge results in defects such as, inter alia, fogging, in which low-charge toner ends up being developed into non-image areas, and poor regulation, in which overcharged toner fuses to the toner carrying member, which are factors that prevent faithful reproduction of the latent image.

As a consequence, and with the goal of improving image quality, investigations have been widely carried out into controlling toner charging by attaching a material having an excellent charging performance to the toner particle surface or by coating the toner particle surface with a material having an excellent charging performance.

Japanese Patent Application Laid-open No. 2018-194833 discloses a toner that achieves development durability, a high charging performance, and an inhibition of overcharging, through control of the toner charge decay constant by the presence on the toner base particle surface of metal oxide fine particles coated with an organosilicon condensate.

Japanese Patent Application Laid-open No. 2001-209207 discloses a toner having an improved development performance and durability, achieved by attaching inorganic fine particles constituted of a phosphate anion and zirconium ion on the toner surface.

SUMMARY OF THE INVENTION

However, while the image quality for the toners described in these patent documents is excellent, they are inadequate from the standpoint of charge control, and additional improvements are required in order to achieve the image quality levels that will be required in the future.

The present invention provides a toner that enables precise charging control and can achieve a high image quality.

A toner comprising a toner particle, wherein the toner particle includes a toner base particle containing a binder resin and includes a protruded portion on a surface of the toner base particle;

the protruded portion comprises an organosilicon polymer and a polyhydric acid metal salt; and the polyhydric acid metal salt is present on a surface of the protruded portion.

The present invention provides a toner that enables precise charging control and can achieve a high image quality.

Further features of the present invention will become apparent from the following description of exemplary embodiments with reference to the attached drawings.

DESCRIPTION OF THE EMBODIMENTS

Figure 1:
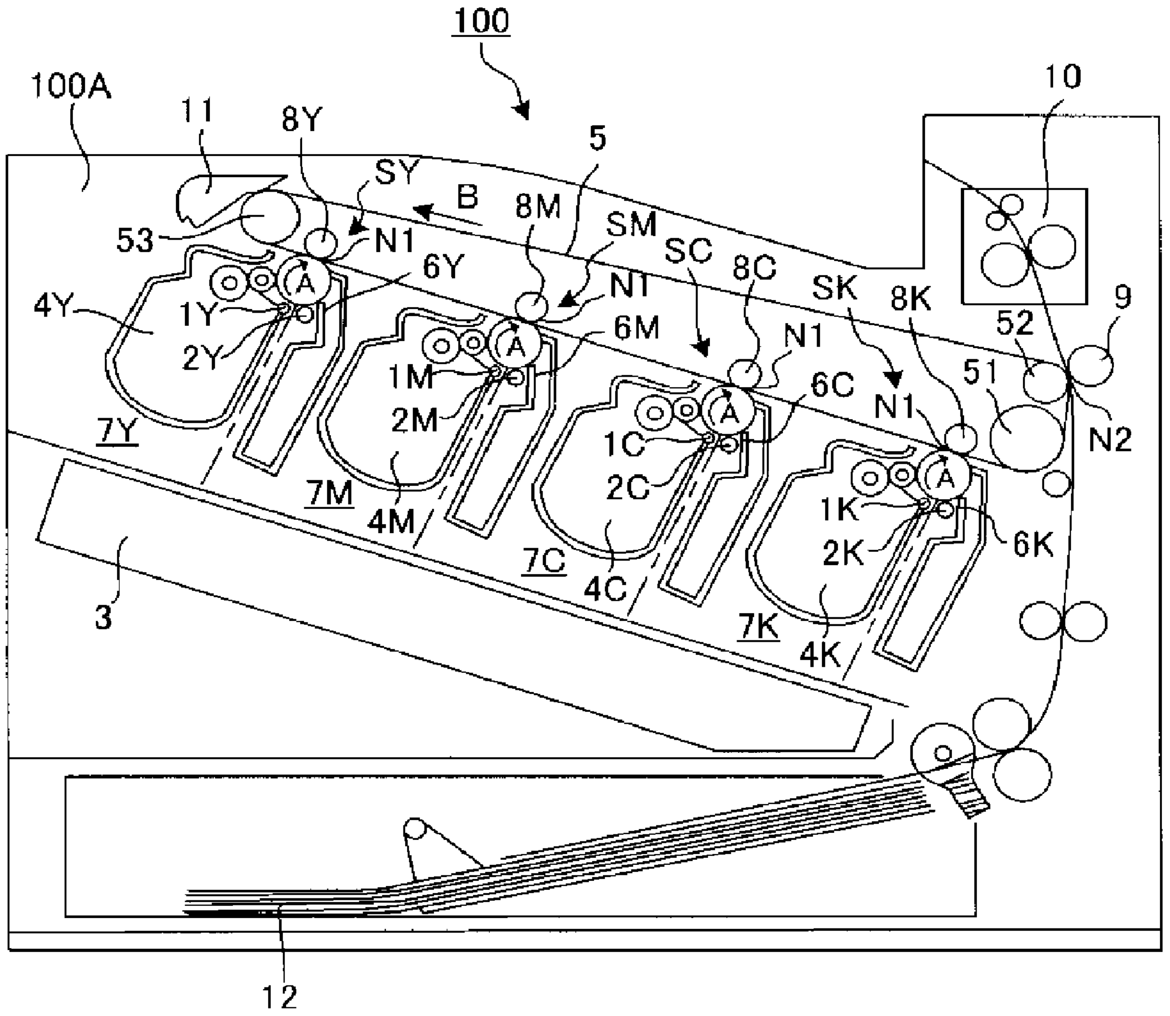
FIG. 1 contains an example of a cross-sectional diagram of an image-forming apparatus.

Unless otherwise specified, descriptions of numerical ranges such as "from XX to YY" or "XX to YY" in the present invention include the numbers at the upper and lower limits of the range.

A toner according to the present invention includes a toner particle, wherein:

the toner particle includes a toner base particle containing a binder resin and includes a protruded portion on a surface of the toner base particle;

the protruded portion contains an organosilicon polymer and a polyhydric acid metal salt; and the polyhydric acid metal salt is present on a surface of the protruded portions.

The present inventors focused on the toner charging process in investigations into controlling the charge quantity on toner. Conventional toner charging processes primarily employ triboelectric charging; however, when only triboelectric charging is employed, overcharged toner and low-charge toner can be produced because rubbing between the charging member or carrier (collectively referred to as the charging member in the following) and the toner does not occur uniformly. This is because charging by triboelectric charging is produced only in regions where the toner is in contact with the charging member.

In addition, triboelectric charging is quite susceptible to influence by humidity, and the charge quantity can end up varying in a low-humidity environment and a high-humidity environment. Moreover, because triboelectric charging is very sensitive to toner flowability, the charge quantity may change when the flowability declines when the toner deteriorates due to, for example, long-term use.

Thus, the triboelectric charging-mediated charging process is unsatisfactory with respect to precision charging control. Moreover, the problems exhibited by the triboelectric charging process are not satisfactorily solved even when, in order to solve these problems, a material having an excellent charging performance is attached to the toner particle surface or the toner particle surface is coated with a material having an excellent charging performance. Due to this, a fundamentally different charging process is required when one contemplates the additional increases in image quality that will be required in the future.

The present inventors therefore focused on injection charging as a charging process that is different from triboelectric charging. Injection charging is a process in which the toner is charged through the injection of charge based on the potential difference between the toner and charging member. When, in this case, conduction paths are present in the toner and toner-to-toner, the entire toner can be uniformly charged rather than just those regions in contact with the charging member.

Moreover, since, when injection charging is present, the charge quantity can be freely controlled by changing the potential difference, the charge quantity required by the system can then be easily satisfied. Furthermore, since injection charging is resistant to the influence of humidity, environmentally-induced variations in the charge quantity can be suppressed.

Thus, toner charge could be more precisely controlled if, in addition to the toner having a triboelectric charging capability, an injection charging capability, in which charging is based on potential difference, could be established. The present inventors therefore carried out intensive investigations into various materials and architectures for toner and as a result discovered an architecture in which protruded portions, containing an organosilicon polymer and a polyhydric acid metal salt, are formed on the surface of a binder resin-containing toner base particle with the polyhydric acid metal salt being present on the surface of the protruded portion. It was also discovered that a toner having this architecture has an injection charging capability that enables control of the charge quantity through the potential difference, whereby precise control of the charge quantity is then made possible. The present invention was achieved based on these discoveries.

The present inventors hypothesize as follows with regard to the factors that enable an injection charging capability to be achieved for toner.

Generally an object must be a conductor in order for the object to undergo injection charging. However, when toner behaves as a normal conductor, the charge provided by charging rapidly leaks off and as a result the charge quantity becomes too low and utilization is then problematic. Thus, in order to provide toner with an injection charging capability while enabling retention of adequate charge, on the one hand behavior as a conductor in the charging process is required, while behavior as an insulator is required in other aspects.

Considering here, within the process realm, the process of single-component contact development, a characteristic feature of the charging process is that the toner assumes a compacted condition sandwiched between the regulating blade and the charging roller. In other charging processes also, a tight cohesion with the charging member is required during charging and the toner assumes a compacted condition. Thus, toner that behaves as a conductor in the compacted condition and behaves as an insulator in a condition where the pressure has been released (pressure-released condition in the following), will presumably have an injection charging capability.

With toner that has the polyhydric acid metal salt at the surface of protruded portions that contain an organosilicon polymer and the polyhydric acid metal salt, a large amount of charge is injected due to potential difference because the polyhydric acid metal salt has a high polarity and a moderate volume resistivity. At the same time, the injected charge can rapidly accumulate at the interface between the organosilicon polymer and the polyhydric acid metal salt. When this occurs, leakage of the charge to the toner base particle is inhibited since the organosilicon polymer has a high volume resistivity.

In addition, by having the polyhydric acid metal salt at the surface of the protruded portion, in the compacted condition conduction paths that extend into the toner layer as a whole are formed by surfacewise contact between the polyhydric acid metal salt at the protruded portion surface and polyhydric acid metal salt on adjacent toner, and charge injection into the toner layer as a whole can then be achieved. On the other hand, in the pressure-released condition, due to the spacer effect of the protruded portions, contact with adjacent toner becomes pointwise contact and the conduction paths are extinguished and the occurrence of charge leakage is then impeded.

In this manner, due to the characteristics of the polyhydric acid metal salt, which has a high polarity and a moderate volume resistivity, the injected charge, traveling via the conduction paths formed during compaction, spreads into the toner layer as a whole and accumulates at the polyhydric acid metal salt/organosilicon polymer interface. On the other hand, when the pressure is released, the toner-to-toner contact area declines due to the spacer effect exercised by the protruded portions and the conduction paths are extinguished and leakage of the charge can then be restrained.

The mechanisms described in the preceding make it possible for this toner to retain a satisfactory charge quantity while having an injection charging capability.

The toner is described in detail in the following.

The protruded portions possessed by the toner particle contain an organosilicon polymer and a polyhydric acid metal salt with the polyhydric acid metal salt being present on the protruded portion surfaces. Specific examples of the organosilicon polymer and polyhydric acid metal salt are described below.

Structure of Toner Cross Section

Preferred embodiments are described here below with regard to observation of the toner cross section with a transmission electron microscope.

In an EDX mapping image of the constituent elements of a cross section of the toner obtained by analyzing the cross section of the toner as observed with a transmission electron microscope using energy-dispersive x-ray spectroscopy, preferably an image of the toner base particle and an image of the organosilicon polymer are observed, and the organosilicon polymer image is observed at a location that corresponds to the surface of the toner base particle in the toner base particle image.

In addition, when, in the EDX mapping image, a line segment that connects the end points of the interface formed between the organosilicon polymer image and the toner base particle image to each other is designated as a base line, a length of a perpendicular line having a maximum length among the perpendicular lines that connect the base line to the surface of the organosilicon polymer image is designated as image height H (nm), the organosilicon polymer image for which the image height H is from 30 nm to 300 nm is designated as protruded portion A, a length of a perimeter of the toner base particle image is designated as toner perimeter length D (nm), a length of the base line in the protruded portion A is designated as protrusion width W (nm), and a sum of the protrusion width W in one toner particle is designated as $W_{all}$ (nm), preferably the following formula (1) is satisfied:

$$0.30 \le W_{all}/D \le 0.90 \quad (1).$$

The $W_{all}/D$ in formula (1) represents the state of coating of the toner base particle by the protruded portion A, wherein larger numerical values indicate a higher coating ratio and smaller numerical values indicate a lower coating ratio. This coating state contributes to a spacer effect in the pressure-released condition. In addition, this coating state also contributes to the fixing performance of the toner. The organosilicon polymer has a higher hardness than ordinary resins and as a result, when present in large amounts in the toner, it can cause a decline in the fixing performance of the toner.

When the relationship in formula (1) is satisfied, this facilitates achieving charge retention by providing a satisfactory spacer effect, while at the same time an excellent retention of the fixing performance is also made possible.

The arithmetic average value of the protrusion width W (nm) is preferably 20 to 500 and more preferably 50 to 300.

The following formula (1-2) is more preferably satisfied and the following formula (1-3) is still more preferably satisfied.

$$0.40 \leq W_{all}/D \leq 0.80 \quad (1\text{-}2)$$

$$0.50 \leq W_{all}/D \leq 0.70 \quad (1\text{-}3)$$

$W_{all}/D$ can be adjusted using the production method and amount of starting materials when the protruded portions are formed on the toner base particle. Methods for forming the protruded portions are described below.

With reference to the EDX mapping image of the constituent elements in the toner cross section, preferably a polyhydric acid metal salt image is observed in at least a portion of the surface of the protruded portions A.

When the peripheral length of the protruded portion A is designated as protrusion peripheral length C (nm), the total of the length of the portions where the polyhydric acid metal salt image is present in the periphery of one protruded portion A is designated as $C_M$ (nm), the total of the protrusion peripheral length C for the protruded portions A in one toner particle is designated as $C_{all}$ (nm), and the total of the length $C_M$ in one toner particle is designated as $C_{Mall}$ (nm), the following formula (2) is preferably satisfied:

$$0.05 \leq C_{Mall}/C_{all} \leq 0.50 \quad (2).$$

The $C_{Mall}/C_{all}$ in formula (2) represents the state of coating of the protruded portions by the polyhydric acid metal salt, wherein larger numerical values indicate a higher coating ratio and smaller numerical values indicate a lower coating ratio. This coating state contributes to the formation and extinction of conduction paths in the compacted condition and pressure-released condition. When formula (2) is satisfied, satisfactory conduction paths are formed in the compacted condition, while extinction of the conduction paths is facilitated in the pressure-released condition, and achieving charge retention and an injection charging capability is facilitated. A more precise charge control can thus be achieved.

When $C_{Mall}/C_{all}$ is greater than or equal to 0.05, the state of coating of the protruded portions by the metal is then favorable and as a consequence a large amount of change in the charge quantity can be obtained as a function of the potential difference. A suitable charge quantity is readily obtained when $C_{Mall}/C_{all}$ is not greater than 0.50.

The following formula (2-1) is more preferably satisfied and the following formula (2-2) is still more preferably satisfied.

$$0.05 \leq C_{Mall}/C_{all} \leq 0.40 \quad (2\text{-}1)$$

$$0.10 \leq C_{Mall}/C_{all} \leq 0.30 \quad (2\text{-}2)$$

$C_{Mall}/C_{all}$ can be adjusted through the production method and starting material amounts used during attachment of the polyhydric acid metal salt. Methods for attaching the polyhydric acid metal salt are described below.

State of Immobilization of Protruded Portions and Polyhydric Acid Metal Salt

Preferred states of immobilization for the protruded portions and polyhydric acid metal salt on the toner are described in detail in the following.

Preferably, when metal element M refers to the metal element contained in the polyhydric acid metal salt; M1 (atomic %) is the ratio of the metal element M in the constituent elements of the toner surface, as determined from the spectrum obtained using x-ray photoelectron spectroscopic analysis of the toner; Si1 (mass %) is the mass ratio of the organosilicon polymer contained in the toner, as determined from the spectrum obtained by fluorescent x-ray analysis of the toner;

toner (a) designates the toner obtained by the execution of a treatment (a) of dispersing 1.0 g of the toner in an aqueous mixed solution containing 31.0 g of a 61.5 mass % aqueous sucrose solution and 6.0 g of a 10 mass % aqueous solution of a neutral detergent for cleaning precision measurement instrumentation and containing a nonionic surfactant, anionic surfactant, and organic builder, and shaking at 300 times per minute for 20 minutes using a shaker;

M2 (atomic %) is the ratio of the metal element M in the constituent elements of the surface of the toner (a), as determined from the spectrum obtained using x-ray photoelectron spectroscopic analysis of the toner (a); and Si2 (mass %) is the mass ratio of the organosilicon polymer contained in the toner (a), as determined from the spectrum obtained by fluorescent x-ray analysis of the toner (a), M1 and M2 are both from 1.00 to 10.00, and M1, Si1, M2, and Si2 satisfy the following formulas (3) and (4):

$$0.90 \leq M2/M1 \quad (3)$$

$$0.90 \leq Si2/Si1 \quad (4).$$

More preferably, when toner (b) designates the toner obtained by the execution of a treatment (b) of applying ultrasound at an electrical output of 120 W to the toner (a) on which the treatment (a) has been carried out;

M3 (atomic %) is the ratio of the metal element M in the constituent elements of the surface of the toner (b), as determined from the spectrum obtained using x-ray photoelectron spectroscopic analysis of the toner (b); and Si3 (mass %) is the mass ratio of the organosilicon polymer contained in the toner (b), as determined from the spectrum obtained by fluorescent x-ray analysis of the toner (b), M3 is from 1.00 to 10.00, and M2, Si2, M3, and Si3 satisfy the following formulas (5) and (6):

$$0.90 \leq M3/M2 \quad (5)$$

$$0.90 \leq Si3/Si2 \quad (6).$$

Polyhydric acid metal salt and organosilicon polymer that are weakly attached to the toner base particle surface can be removed by the treatment (a). Specifically, polyhydric acid metal salt and organosilicon polymer that have been attached to the toner base particle by a dry method are readily removed by the treatment (a). On the other hand, polyhydric acid metal salt and organosilicon polymer that have been relatively strongly immobilized on the toner base particle surface can be removed by the treatment (b).

Thus, the state of immobilization of the polyhydric acid metal salt and organosilicon polymer present on the toner base particle surface can be evaluated using treatments (a) and (b). A smaller change in each parameter as caused by treatment (a) and treatment (b) indicates a stronger immobilization of the polyhydric acid metal salt and organosilicon polymer on the toner base particle.

M1, M2, and M3 show the coating state of the toner base particle surface by the polyhydric acid metal salt before and after the respective treatments. The coating state of the toner base particle surface by the polyhydric acid metal salt contributes to the formation and extinction of conduction paths in the compacted condition and pressure-released condition.

M1, M2, and M3 are each preferably from 1.00 atomic % to 10.00 atomic %. When this range is obeyed, satisfactory conduction paths are formed in the compacted condition while the conduction paths are readily extinguished in the pressure-released condition, and charge retention and an injection charging capability are then readily achieved. A more precise charge control can thus be achieved.

M1, M2, and M3 are each more preferably from 1.00 atomic % to 7.00 atomic % and still more preferably from 1.50 atomic % to 5.00 atomic %.

M1 can be adjusted through, for example, the amount of attachment, method of attachment, and attachment conditions used for the polyhydric acid metal salt during toner production.

Si1, Si2, and Si3 show the amount of the organosilicon polymer present in the toner before and after the respective treatments. The amount of organosilicon polymer present in the toner contributes to the fixing performance by the toner. The organosilicon polymer has a higher hardness than ordinary resins, and as a consequence the presence of large amounts in the toner can cause a decline in the fixing performance by the toner.

Si1, Si2, and Si3 are each preferably from 0.01 mass % to 20.00 mass % and are more preferably from 0.10 mass % to 10.00 mass %.

Formulas (3) and (5) indicate the ratio at which the polyhydric acid metal salt is not released from the toner base particle surface in the treatments (a) and (b), respectively, and remains present. When M2/M1 and M3/M2 are greater than or equal to 0.90, the polyhydric acid metal salt is strongly immobilized on the toner base particle surface and a toner can then be obtained that exhibits an excellent durability wherein the injection charging characteristics can be stably expressed at the time of use even on a long-term basis.

In addition, having M2/M1 and M3/M2 be greater than or equal to 0.90 indicates strong adhesion between the protruded portion and polyhydric acid metal salt. In this case, a broad area is established for the protruded portion/polyhydric acid metal salt interface and more charge can then accumulate at the protruded portion/polyhydric acid metal salt interface and the charge quantity due to injection charging can be further increased.

M2/M1 and M3/M2 are both more preferably greater than or equal to 0.90 and are both still more preferably greater than or equal to 0.95. The upper limit is not particularly limited, but M2/M1 is preferably less than or equal to 1.00 and more preferably less than or equal to 0.99. M3/M2 is preferably less than or equal to 0.99 and more preferably less than or equal to 0.97.

M2/M1 and M3/M2 can be adjusted through, for example, the method for producing the polyhydric acid metal salt and its method of attachment and conditions of attachment during toner production.

Formulas (4) and (6) indicate the ratio at which the organosilicon polymer-containing protruded portions are not released from the toner base particle surface in the treatments (a) and (b), respectively, and remain present. When Si2/Si1 and Si3/Si2 are greater than or equal to 0.90, the protruded portions are strongly immobilized on the toner base particle surface and a toner can then be obtained that exhibits an excellent durability wherein the injection charging characteristics can be stably expressed at the time of use even on a long-term basis.

Si2/Si1 and Si3/Si2 are both more preferably greater than or equal to 0.90 and are both still more preferably greater than or equal to 0.95. The upper limit is not particularly limited, but Si2/Si1 is preferably less than or equal to 1.00 and more preferably less than or equal to 0.99. Si3/Si2 is preferably less than or equal to 1.00 and more preferably less than or equal to 0.99.

Si2/Si1 and Si3/Si2 can be adjusted through, for example, the type of organosilicon compound used as a starting material for the organosilicon polymer and the attachment conditions for the organosilicon polymer during toner production.

The materials contained in the toner are described in detail in the following.

Polyhydric Acid Metal Salt and Metal Compound

The polyhydric acid metal salt contained in the toner is described in detail in the following.

As indicated above, the polyhydric acid metal salt, by having a moderate volume resistivity and a high polarity originating with the salt structure, can increase the injected amount of charge and its transfer rate in the injection charging process, as compared to that for the use of other materials, e.g., metal oxides.

Among other things, the volume resistivity of the polyhydric acid metal salt, as measured by the 4-probe method, is preferably from $1.0\times10^{5}$ Ω·cm to $1.0\times10^{11}$ Ω·cm and is more preferably from $1.0\times10^{7}$ Ω·cm to $1.0\times10^{9}$ Ω·cm.

The volume resistivity can be measured by sandwiching a fine particle powder of the polyhydric acid metal salt with electrodes, establishing a condition in which a certain load is applied using a torque wrench, and measuring the resistance and the distance between the electrodes. A detailed measurement method is described below.

When the volume resistivity is in the indicated range, the charge undergoes rapid transfer and as a consequence a rapid charge rise occurs and a satisfactory charge quantity can then be obtained even in a high-speed charging process.

A salt constituted of a heretofore known polyhydric acid and metal can be used without particular limitation as the polyhydric acid metal salt.

The polyhydric acid metal salt preferably contains at least one metal element selected from the group consisting of the metal elements in group 3 to group 13. The salt between the polyhydric acid and group 3 to group 13 metal element forms a network structure in which the polyhydric acid ion crosslinks or bridges between metal ions; this suppresses the infiltration of water molecules into the interior and the moisture absorptivity is low as a consequence. An injection charging capability can then be obtained in a stable manner even in high-humidity environments.

The Pauling electronegativity of the metal element is preferably from 1.25 to 1.85 and is more preferably from 1.30 to 1.70. When the electronegativity of the metal element is in the indicated range, this facilitates the generation of a polarity difference versus the polyhydric acid and provides a large polarization within the polyhydric acid metal salt, and as a result the charge quantity provided by injection charging can be further increased.

The values provided in "Chemical Handbook, Basic Edition", revised 5th edition, edited by The Chemical Society of Japan (2004) (Maruzen Publishing), table on the back of the front cover, were used for the Pauling electronegativity.

The metal element can be specifically exemplified by titanium (group 4, electronegativity: 1.54), zirconium (group 4, 1.33), aluminum (group 13, 1.61), zinc (group 12, 1.65), indium (group 13, 1.78), hafnium (group 4, 1.30), iron (group 8, 1.83), copper (group 11, 1.90), silver (group 11, 1.93), and calcium (group 2, 1.00).

Among the preceding, the use is preferred of a metal that can have a valence of at least 3, with at least one selection from the group consisting of titanium, zirconium, and aluminum being more preferred and titanium being even more preferred.

The polyhydric acid preferably contains an inorganic acid. Inorganic acids have a more rigid molecular skeleton than organic acids and as a consequence they undergo little change in properties during long-term storage. An injection charging capability can thus be obtained in a stable manner even after long-term storage.

The polyhydric acid can be specifically exemplified by inorganic acids, e.g., phosphoric acid (tribasic), carbonic acid (dibasic), and sulfuric acid (dibasic), and by organic acids such as dicarboxylic acids (dibasic) and tricarboxylic acids (tribasic).

The organic acids can be specifically exemplified by dicarboxylic acids such as oxalic acid, malonic acid, succinic acid, glutaric acid, adipic acid, fumaric acid, maleic acid, pimelic acid, suberic acid, azelaic acid, sebacic acid, phthalic acid, isophthalic acid, and terephthalic acid, and by tricarboxylic acids such as citric acid, aconitic acid, and trimellitic anhydride.

Among the preceding, at least one selection from the group consisting of phosphoric acid, carbonic acid, and sulfuric acid, which are inorganic acids, is preferred with phosphoric acid being particularly preferred.

Polyhydric acid metal salts that are combinations of the aforementioned metals and polyhydric acids can be specifically exemplified by metal phosphate salts such as titanium phosphate compounds, zirconium phosphate compounds, aluminum phosphate compounds, and copper phosphate compounds; metal sulfate salts such as titanium sulfate compounds, zirconium sulfate compounds, and aluminum sulfate compounds; metal carbonate salts such as titanium carbonate compounds, zirconium carbonate compounds, and aluminum carbonate compounds; and metal oxalate salts such as titanium oxalate compounds.

Among the preceding, the phosphate ion provides a high strength due to metal-to-metal bridging and also provides an excellent charge rise performance due to the presence of ionic bonding in the molecule, and the polyhydric acid metal salt thus preferably contains a metal phosphate salt and more preferably contains a titanium phosphate compound.

The method for obtaining the polyhydric acid metal salt is not particularly limited and known methods can be used. Preferred thereamong are methods in which the polyhydric acid metal salt is obtained by reacting, in an aqueous medium, the polyhydric acid ion with a metal compound that functions as the metal source.

The metal source should be a metal compound that yields the polyhydric acid metal salt by reacting with the polyhydric acid ion, but is not otherwise particularly limited and heretofore known metal compounds can be used.

Specific examples are metal chelates such as titanium lactate, titanium tetraacetylacetonate, ammonium titanium lactate, titanium triethanolaminate, zirconium lactate, ammonium zirconium lactate, aluminum lactate, aluminum trisacetylacetonate, and copper lactate, and metal alkoxides such as titanium tetraisopropoxide, titanium ethoxide, zirconium tetraisopropoxide, and aluminum trisisopropoxide.

Metal chelates are preferred among the preceding because their reaction is easily controlled and they react quantitatively with the polyhydric acid ion. Lactic acid chelates, e.g., titanium lactate, zirconium lactate, and so forth, are more preferred from the standpoint of solubility in aqueous media.

An ion of the aforementioned polyhydric acids can be used as the polyhydric acid ion. With regard to the form in the case of addition to an aqueous medium, the polyhydric acid may be added as such or a water-soluble polyhydric acid metal salt may be added to the aqueous medium and may dissociate in the aqueous medium.

The content of the polyhydric acid metal salt in the toner particle is preferably from 0.01 mass % to 5.00 mass %, more preferably from 0.02 mass % to 3.00 mass %, and still more preferably from 0.05 mass % to 2.00 mass %.

Organosilicon Polymer and Organosilicon Compound

The organosilicon polymer contained in the protruded portions is described in detail in the following.

There are no particular limitations on the organosilicon polymer and known organosilicon polymers can be used. Among these, the use is preferred of an organosilicon polymer having the structure represented by the following formula (I).

$$R—SiO_{3/2} \quad (I)$$

(In formula (I), R represents an alkyl group having preferably 1 to 8 and more preferably 1 to 6 carbons, an alkenyl group having preferably 1 to 6 and more preferably 1 to 4 carbons, an acyl group having preferably 1 to 6 and more preferably 1 to 4 carbons, an aryl group having preferably 6 to 14 and more preferably 6 to 10 carbons, or a methacryloxyalkyl group.)

Formula (I) shows that the organosilicon polymer has an organic group and a silicon polymer moiety. Due to this, an organosilicon polymer containing the formula (I) structure tightly bonds to the toner base particle because the organic group exhibits affinity for the toner base particle, and tightly bonds to the polyhydric acid metal salt because the silicon polymer moiety exhibits affinity for the polyhydric acid metal salt. As a result, the polyhydric acid metal salt can be more strongly immobilized on the toner base particle via the protruded portion because the organosilicon polymer acts to bond the toner base particle to the polyhydric acid metal salt.

Formula (I) also shows that the organosilicon polymer is crosslinked. The strength of the organosilicon polymer is increased because the organosilicon polymer has a crosslinked structure, while the hydrophobicity is increased because there is little residual silanol group. A toner can thus be obtained that has an even better durability and that exhibits stable properties even in high-humidity environments.

The R in formula (I) is preferably an alkyl group having from 1 to 6 carbons, e.g., the methyl group, propyl group, normal-hexyl group, and so forth, or a vinyl group, phenyl group, or methacryloxypropyl group, with an alkyl group having from 1 to 6 carbons and the vinyl group being more preferred. Due to control of the molecular mobility of the organic group, an organosilicon polymer having the instant structure has both hardness and flexibility, and as a consequence deterioration of the toner is suppressed, even in the case of long-term use, and excellent properties are exhibited.

Known organosilicon compounds can be used without particular limitation as the organosilicon compound for obtaining the organosilicon polymer. Among these, at least one selection from the group consisting of organosilicon compounds having the following formula (II) is preferred.

$$R—Si—Ra_3 \quad (II)$$

Where, in formula (II), each Ra independently represents a halogen atom or an alkoxy group (preferably having 1 to 4 carbons and more preferably 1 to 3 carbons), and each R independently represents an alkyl group (preferably having 1 to 8 carbons and more preferably 1 to 6 carbons), an alkenyl group (preferably having 1 to 6 carbons and more preferably 1 to 4 carbons), an aryl group (preferably having 6 to 14 carbons and more preferably 6 to 10 carbons), an acyl group (preferably having 1 to 6 carbons and more preferably 1 to 4 carbons), or a methacryloxyalkyl group.

The trifunctional silane compounds can be exemplified by the following compounds:

trifunctional methylsilane compounds such as methyltrimethoxysilane, methyltriethoxysilane, methyldiethoxymethoxysilane, and methylethoxydimethoxysilane;

trifunctional silane compounds such as ethyltrimethoxysilane, ethyltriethoxysilane, propyltrimethoxysilane, propyltriethoxysilane, butyltrimethoxysilane, butyltriethoxysilane, hexyltrimethoxysilane, and hexyltriethoxysilane;

trifunctional phenylsilane compounds such as phenyltrimethoxysilane and phenyltriethoxysilane;

trifunctional vinylsilane compounds such as vinyltrimethoxysilane and vinyltriethoxysilane;

trifunctional allylsilane compounds such as allyltrimethoxysilane, allyltriethoxysilane, allyldiethoxymethoxysilane, and allylethoxydimethoxysilane; and trifunctional γ-methacryloxypropylsilane compounds such as γ-methacryloxypropyltrimethoxysilane, γ-methacryloxypropyltriethoxysilane, γ-methacryloxypropyldiethoxymethoxysilane, and γ-methacryloxypropylethoxydimethoxysilane.

The R in formula (II) is preferably an alkyl group having from 1 to 6 carbons, e.g., the methyl group, propyl group, normal-hexyl group, and so forth, or a vinyl group, phenyl group, or methacryloxypropyl group, with an alkyl group having from 1 to 6 carbons and the vinyl group being more preferred. This makes it possible to obtain an organosilicon polymer that satisfies the preferred range for formula (I).

When Ra is an alkoxy group, the organosilicon polymer can be obtained in a stable manner because a suitable reactivity in aqueous media is exhibited, and this is thus preferred. Ra is more preferably the methoxy group or ethoxy group.

Binder Resin

The toner particle contains a binder resin.

Known resins can be used without particular limitation as the binder resin. Specific examples are vinyl resins, polyester resins, polyurethane resins, and polyamide resins. The binder resin preferably comprises a vinyl resin.

The polymerizable monomer that can be used to produce the vinyl resin can be exemplified by the following: styrene and styrenic monomers such as α-methylstyrene;

acrylate esters such as methyl acrylate and butyl acrylate;

methacrylate esters such as methyl methacrylate, 2-hydroxyethyl methacrylate, t-butyl methacrylate, and 2-ethylhexyl methacrylate;

unsaturated carboxylic acids such as acrylic acid and methacrylic acid;

unsaturated dicarboxylic acids such as maleic acid;

unsaturated dicarboxylic acid anhydrides such as maleic anhydride;

nitrile-type vinyl monomers such as acrylonitrile; halogenated vinyl monomers such as vinyl chloride; and nitro-type vinyl monomers such as nitrostyrene.

Preferred among the preceding are binder resins that contain a resin having an acid value. When the toner particle contains a resin having an acid value, by using as the polyhydric acid metal salt a salt containing polyhydric acid and an at least trivalent metal, resin-to-resin crosslinking occurs via the metal during the fixing step through ligand exchange between the polyhydric acid of the polyhydric acid metal salt and the acid possessed by the resin. This can suppress the defect wherein after fixing an image sticks to a subsequently output image. This effect is significant in particular in high-speed image-forming processes.

The acid value of the resin having an acid value is preferably from 1 mg KOH/g to 50 mg KOH/g and more preferably from 2 mg KOH/g to 30 mg KOH/g.

Colorant

The toner particle may contain a colorant. The heretofore known magnetic bodies and pigments and dyes in the colors of black, yellow, magenta, and cyan as well as in other colors may be used without particular limitation as this colorant.

The black colorant can be exemplified by black pigments such as carbon black.

The yellow colorant can be exemplified by yellow pigments and yellow dyes, e.g., monoazo compounds, disazo compounds, condensed azo compounds, isoindolinone compounds, benzimidazolone compounds, anthraquinone compounds, azo metal complexes, methine compounds, and allylamide compounds.

Specific examples are C. I. Pigment Yellow 74, 93, 95, 109, 111, 128, 155, 174, 180, and 185 and C. I. Solvent Yellow 162.

The magenta colorants can be exemplified by magenta pigments and magenta dyes, e.g., monoazo compounds, condensed azo compounds, diketopyrrolopyrrole compounds, anthraquinone compounds, quinacridone compounds, basic dye lake compounds, naphthol compounds, benzimidazolone compounds, thioindigo compounds, and perylene compounds.

Specific examples are C. I. Pigment Red 2, 3, 5, 6, 7, 23, 48:2, 48:3, 48:4, 57:1, 81:1, 122, 144, 146, 150, 166, 169, 177, 184, 185, 202, 206, 220, 221, 238, 254, and 269, and C. I. Pigment Violet 19.

The cyan colorants can be exemplified by cyan pigments and cyan dyes, e.g., copper phthalocyanine compounds and derivatives thereof, anthraquinone compounds, and basic dye lake compounds.

Specific examples are C. I. Pigment Blue 1, 7, 15, 15:1, 15:2, 15:3, 15:4, 60, 62, and 66.

The colorant amount, considered per 100.0 mass parts of the binder resin or polymerizable monomer, is preferably from 1.0 mass parts to 20.0 mass parts.

The toner may also be made into a magnetic toner by the incorporation of a magnetic body.

In this case, the magnetic body may also function as a colorant.

The magnetic body can be exemplified by iron oxides as represented by magnetite, hematite, and ferrite; metals as represented by iron, cobalt, and nickel; alloys of these metals with a metal such as aluminum, cobalt, copper, lead, magnesium, tin, zinc, antimony, beryllium, bismuth, cadmium, calcium, manganese, selenium, titanium, tungsten, and vanadium; and mixtures thereof.

Wax

The toner particle may contain a wax. Known waxes can be used without particular limitation as this wax.

Specifically the following wax can be used: esters between a monohydric alcohol and a monocarboxylic acid, e.g., behenyl behenate, stearyl stearate, and palmityl palmitate; esters between a dibasic carboxylic acid and a monoalcohol, e.g., dibehenyl sebacate; esters between a dihydric alcohol and a monocarboxylic acid, e.g., ethylene glycol distearate and hexanediol dibehenate; esters between a trihydric alcohol and a monocarboxylic acid, e.g., glycerol tribehenate; esters between a tetrahydric alcohol and a monocarboxylic acid, e.g., pentaerythritol tetrastearate and pentaerythritol tetrapalmitate; esters between a hexahydric alcohol and a monocarboxylic acid, e.g., dipentaerythritol hexastearate and dipentaerythritol hexapalmitate; esters between a polyfunctional alcohol and a monocarboxylic acid, e.g., polyglycerol behenate; natural ester waxes such as carnauba wax and rice wax; petroleum-based hydrocarbon waxes, e.g., paraffin wax, microcrystalline wax, and petrolatum, and derivatives thereof; hydrocarbon waxes provided by the Fischer-Tropsch method and derivatives thereof; polyolefin-type hydrocarbon waxes, e.g., polyethylene wax and polypropylene wax, and their derivatives; higher aliphatic alcohols; fatty acids such as stearic acid and palmitic acid; and acid amide waxes.

From the standpoint of the release performance, the wax amount, considered per 100.0 mass parts of the binder resin or polymerizable monomer, is preferably from 1.0 mass parts to 30.0 mass parts and is more preferably from 5.0 mass parts to 20.0 mass parts.

Charge Control Agent

The toner particle may contain a charge control agent. The heretofore known charge control agents may be used without particular limitation as this charge control agent.

Negative-charging charge control agents can be specifically exemplified by metal compounds of aromatic carboxylic acids such as salicylic acid, alkylsalicylic acid, dialkylsalicylic acid, naphthoic acid, and dicarboxylic acids, and by polymers and copolymers that contain such a metal compound of an aromatic carboxylic acid;

polymers and copolymers bearing a sulfonic acid group, sulfonate salt group, or sulfonate ester group;

metal salts and metal complexes of azo dyes and azo pigments; and boron compounds, silicon compounds, and calixarene.

The positive-charging charge control agents, on the other hand, can be exemplified by quaternary ammonium salts and polymeric compounds that have a quaternary ammonium salt in side chain position; guanidine compounds; nigrosine compounds; and imidazole compounds.

The polymers and copolymers that have a sulfonate salt group or sulfonate ester group can be exemplified by homopolymers of a sulfonic acid group-containing vinyl monomer such as styrenesulfonic acid, 2-acrylamido-2-methylpropanesulfonic acid, 2-methacrylamido-2-methylpropanesulfonic acid, vinylsulfonic acid, and methacrylsulfonic acid, and by copolymers of these sulfonic acid group-containing vinyl monomers with other vinyl monomer as indicated in the section on the binder resin.

The charge control agent amount, considered per 100.0 mass parts of the binder resin or polymerizable monomer, is preferably from 0.01 mass parts to 5.0 mass parts.

External Additive

The toner particle, because it has the protruded portions of organosilicon polymer, exhibits excellent properties, e.g., flowability and so forth, even in the absence of an external additive. However, an external additive may be added to the toner particle with the goal of obtaining additional improvements.

The heretofore known external additives may be used without particular limitation as this external additive.

Specific examples are as follows: base silica fine particles, e.g., silica produced by a wet method, silica produced by a dry method, and so forth; silica fine particles provided by subjecting such base silica fine particles to a surface treatment with a treatment agent such as a silane coupling agent, titanium coupling agent, silicone oil, and so forth; and resin fine particles such as vinylidene fluoride fine particles, polytetrafluoroethylene fine particles, and so forth.

The amount of the external additive is preferably from 0.1 mass parts to 5.0 mass parts per 100.0 mass parts of the toner particle.

Toner production methods are described in detail in the following.

Method for Forming Organosilicon Polymer-Containing Protruded Portions

There are no particular limitations on the method for forming the organosilicon polymer-containing protruded portions, and known methods can be used. An example is a method in which the protruded portions are formed on the toner base particle by condensing the organosilicon compound in an aqueous medium in which toner base particles are dispersed. In other methods, the organosilicon polymer-containing protruded portions are attached onto the toner base particle by external mechanical force by a dry procedure or a wet procedure.

Among the preceding, the method in which the protruded portions are formed on the toner base particle by condensing the organosilicon compound in an aqueous medium in which toner base particles are dispersed, is preferred because this enables the protruded portions to be tightly bonded to the toner base particle.

This method is described in the following.

The formation of protruded portions on the toner base particle by this method preferably comprises a step (step 1) of obtaining a toner base particle dispersion of toner base particles dispersed in an aqueous medium, and a step (step 2) of mixing an organosilicon compound (and/or hydrolyzate thereof) into the toner base particle dispersion and forming organosilicon polymer-containing protruded portions on the toner base particles by causing a condensation reaction of the organosilicon compound in the toner base particle dispersion.

The method for obtaining the toner base particle dispersion in step 1 can be exemplified by the following methods: use as such of a dispersion of toner base particles that have been produced in an aqueous medium; and introduction into an aqueous medium of dried toner base particles with mechanical dispersion. A dispersing aid may be used when the dried toner base particles are dispersed in an aqueous medium.

For example, a known dispersion stabilizer or surfactant can be used as the dispersing aid.

The dispersion stabilizer can be specifically exemplified by the following: inorganic dispersion stabilizers such as tricalcium phosphate, hydroxyapatite, magnesium phosphate, zinc phosphate, aluminum phosphate, calcium carbonate, magnesium carbonate, calcium hydroxide, magnesium hydroxide, aluminum hydroxide, calcium metasilicate, calcium sulfate, barium sulfate, bentonite, silica, and alumina, and organic dispersion stabilizers such as polyvinyl alcohol, gelatin, methyl cellulose, methyl hydroxypropyl cellulose, ethyl cellulose, sodium carboxymethyl cellulose, and starch.

The surfactant can be exemplified by anionic surfactants, e.g., alkyl sulfate ester salts, alkylbenzenesulfonate salts, and fatty acid salts; nonionic surfactants such as polyoxyethylene alkyl ethers and polyoxypropylene alkyl ethers; and cationic surfactants such as alkylamine salts and quaternary ammonium salts.

Among the preceding, the presence of an inorganic dispersion stabilizer is preferred, and the presence of a dispersion stabilizer comprising a phosphate salt, e.g., tricalcium phosphate, hydroxyapatite, magnesium phosphate, zinc phosphate, aluminum phosphate, and so forth, is more preferred.

In step 2, the organosilicon compound as such may be added to the toner base particle dispersion, or it may be subjected to hydrolysis followed by addition to the toner base particle dispersion. Preferred therebetween is addition post-hydrolysis, because this facilitates control of the aforementioned condensation reaction and reduces the amount of the organosilicon compound that remains in the toner base particle dispersion.

The hydrolysis is preferably carried out in an aqueous medium having a pH adjusted using a known acid or base. The hydrolysis of organosilicon compounds is known to exhibit a dependence on pH, and the pH when this hydrolysis is carried out is preferably varied as appropriate depending on the species of the organosilicon compound. For example, the pH of the aqueous medium is preferably from 2.0 to 6.0 when methyltriethoxysilane is used as the organosilicon compound.

The acid used to adjust the pH can be specifically exemplified by inorganic acids such as hydrochloric acid, hydrobromic acid, hydroiodic acid, hypochlorous acid, chlorous acid, chloric acid, perchloric acid, hypobromous acid, bromous acid, bromic acid, perbromic acid, hypoiodous acid, iodous acid, iodic acid, periodic acid, sulfuric acid, nitric acid, phosphoric acid, boric acid, and so forth, and by organic acids such as acetic acid, citric acid, formic acid, gluconic acid, lactic acid, oxalic acid, tartaric acid, and so forth.

The following are examples of bases for adjusting the pH: alkali metal hydroxides such as potassium hydroxide, sodium hydroxide, and lithium hydroxide, and their aqueous solutions; alkali metal carbonates such as potassium carbonate, sodium carbonate, and lithium carbonate, and their aqueous solutions; alkali metal sulfates such as potassium sulfate, sodium sulfate, and lithium sulfate, and their aqueous solutions; alkali metal phosphates such as potassium phosphate, sodium phosphate, and lithium phosphate, and their aqueous solutions; alkaline-earth metal hydroxides such as calcium hydroxide and magnesium hydroxide, and their aqueous solutions; and amines such as ammonia and triethylamine.

The condensation reaction in step 2 is preferably controlled by adjusting the pH of the toner base particle dispersion. The condensation reaction of organosilicon compounds is known to exhibit a dependence on pH, and the pH when the condensation reaction is carried out is preferably varied as appropriate depending on the species of the organosilicon compound. For example, the pH of the aqueous medium is preferably from 6.0 to 12.0 when methyltriethoxysilane is used as the organosilicon compound.

The protrusion height H and the protrusion width W of the protruded portions can be controlled by adjusting the pH. Those acids and bases provided as examples with regard to hydrolysis can be used as the acids and bases used to adjust the pH.

Attachment of Polyhydric Acid Metal Salt

There are no particular limitations on the method used to cause the polyhydric acid metal salt to be present at the protruded portion surface, and known methods can be used.

The following methods are examples: obtaining the polyhydric acid metal salt by reacting, in an aqueous medium in which the protruded portion-bearing toner particles are dispersed, a polyhydric acid ion with a metal compound that functions as a metal source; chemically attaching fine particles of the polyhydric acid metal salt onto the protruded portion-bearing toner particle in an aqueous medium in which the protruded portion-bearing toner particles are dispersed; and attaching fine particles of the polyhydric acid metal salt onto the protruded portion-bearing toner particle by a wet or dry procedure using a mechanical external force.

Preferred among the preceding is the method of obtaining the polyhydric acid metal salt by reacting, in an aqueous medium in which the protruded portion-bearing toner particles are dispersed, a polyhydric acid ion with a metal compound that functions as a metal source. The use of this method makes it possible to bring about a uniform dispersion of the polyhydric acid metal salt on the toner particle surface. As a consequence, conduction paths can be efficiently formed and a toner that exhibits an injection charging capability can be obtained using less polyhydric acid metal salt.

More preferably, an organosilicon compound is introduced into the aqueous medium at the same time as the reaction between the metal compound and polyhydric acid ion and organosilicon polymer is obtained by reacting the organosilicon compound in the aqueous medium.

That is, after the formation of the organosilicon polymer-containing protruded portions on the toner base particle surface by a method as described above, the reaction between the metal compound and polyhydric acid ion and the condensation of an organosilicon compound are carried out at the same time in the aqueous medium in which the protruded portion-bearing toner particles are dispersed.

By using this method, fine particles of the polyhydric acid metal salt that are produced in the aqueous medium are fixed, prior to their growth, by organosilicon polymer to the toner particle surface, and as a consequence the dispersity of the polyhydric acid metal salt can be further increased. In addition, because the polyhydric acid metal salt is firmly immobilized by the organosilicon polymer on the toner particle, a highly durable toner can be obtained in which injection charging characteristics can be expressed in a stable manner even during long-term use. In addition, a broad area is established for the organosilicon polymer/polyhydric acid metal salt interface in the protruded portion and as a consequence more charge can then accumulate at the organosilicon polymer/polyhydric acid metal salt interface and the charge quantity due to injection charging can be further increased.

The previously described metal compounds, polyhydric acids, and organosilicon compounds can be used, respectively, for the metal compound, polyhydric acid, and organosilicon compound used in this method.

Production of Toner Base Particle

The method for producing the toner base particle is not particularly limited, and a suspension polymerization method, dissolution suspension method, emulsion aggregation method, pulverization method, and so forth can be used. The suspension polymerization method is preferred among the preceding.

The method of obtaining the toner base particle by suspension polymerization is described in the following as an example.

First, the polymerizable monomer that will produce the binder resin is mixed with any optional additives, and, using a disperser, a polymerizable monomer composition is prepared in which these materials are dissolved or dispersed.

The additives can be exemplified by colorants, waxes, charge control agents, polymerization initiators, chain transfer agents, and so forth.

The disperser can be exemplified by homogenizers, ball mills, colloid mills, and ultrasound dispersers.

The polymerizable monomer composition is then introduced into an aqueous medium that contains sparingly water-soluble inorganic fine particles, and droplets of the polymerizable monomer composition are prepared using a high-speed disperser such as a high-speed stirrer or an ultrasound disperser (granulation step).

The toner base particle is then obtained by polymerizing the polymerizable monomer in the droplets (polymerization step).

The polymerization initiator may be admixed during the preparation of the polymerizable monomer composition or may be admixed into the polymerizable monomer composition immediately prior to the formation of the droplets in the aqueous medium.

In addition, it may also be added, optionally dissolved in the polymerizable monomer or another solvent, during granulation into the droplets or after the completion of granulation, i.e., immediately before the initiation of the polymerization reaction.

After the binder resin has been obtained by the polymerization of the polymerizable monomer, the toner base particle dispersion may be obtained by the optional execution of a solvent removal process.

Heretofore known monomers may be used without particular limitation as the polymerizable monomer when the binder resin is obtained by, for example, an emulsion aggregation method or a suspension polymerization method.

Specific examples in this regard are the vinyl monomers provided as examples in the section on the binder resin.

A known polymerization initiator may be used without particular limitation as the polymerization initiator.

The following are specific examples:

peroxide-type polymerization initiators such as hydrogen peroxide, acetyl peroxide, cumyl peroxide, tert-butyl peroxide, propionyl peroxide, benzoyl peroxide, chlorobenzoyl peroxide, dichlorobenzoyl peroxide, bromomethylbenzoyl peroxide, lauroyl peroxide, ammonium persulfate, sodium persulfate, potassium persulfate, diisopropyl peroxycarbonate, tetralin hydroperoxide, 1-phenyl-2-methylpropyl-1-hydroperoxide, pertriphenylacetic acid-tert-hydroperoxide, tert-butyl performate, tert-butyl peracetate, tert-butyl perbenzoate, tert-butyl perphenylacetate, tert-butyl permethoxyacetate, per-N-(3-tolyl)palmitic acid-tert-butylbenzoyl peroxide, t-butyl peroxy-2-ethylhexanoate, t-butyl peroxypivalate, t-butyl peroxyisobutyrate, t-butyl peroxyneodecanoate, methyl ethyl ketone peroxide, diisopropyl peroxycarbonate, cumene hydroperoxide, 2,4-dichlorobenzoyl peroxide, and lauroyl peroxide; and azo and diazo polymerization initiators as represented by 2,2'-azobis(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, and azobisisobutyronitrile.

An image-forming apparatus is particularly described in the following.

Figure 2:
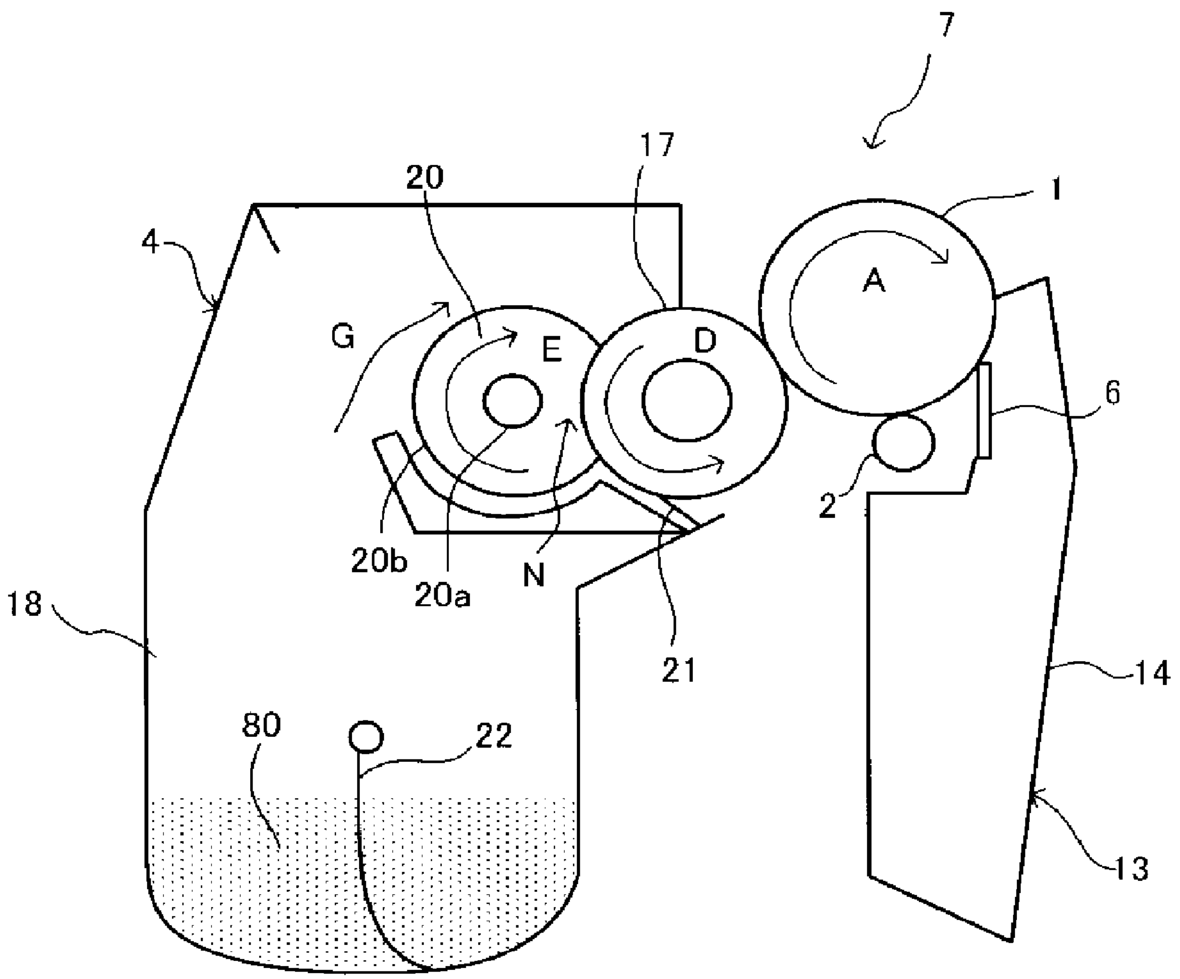
FIG. 2 contains an example of a cross-sectional diagram of a process cartridge.

The reference signs in FIGS. 1 and 2 are as following:

1: photosensitive drum, 2: charging roller, 3: scanner unit, 4: developing unit, 5: intermediate transfer belt, 51: driver roller, 52: secondary transfer opposing roller, 53: driven roller, 6: cleaning member, 7: process cartridge, 8: primary transfer roller, 9: secondary transfer roller, 10: fixing apparatus, 11: intermediate transfer belt cleaning apparatus, 12: recording material, 13: photosensitive member unit, 14: cleaning frame, 17: developing roller, 18: toner holder, 20: toner feed roller, 21: developing blade, 22: stirring transport member, 80: toner, 100: image-forming apparatus.

The toner can be used in known image-forming apparatuses without particular limitation.

Examples in this regard are image-forming apparatuses that utilize a single-component contact developing system, two-component developing system, or single-component jumping developing system.

The description of an image-forming apparatus that utilizes a single-component contact developing system is taken up as an example in the following, but there is no limitation to the following architecture.

The architecture of the image-forming apparatus as a whole is described first.

FIG. 1 is a schematic cross-sectional diagram of an image-forming apparatus 100. The image-forming apparatus 100 is a full-color laser printer that employs an inline system and an intermediate transfer system. The image-forming apparatus 100 can form a full-color image on a recording material (for example, recording paper, plastic sheet, fabric, and so forth) in accordance with image information. The image information is input into the image-forming apparatus main unit 100A from an image-scanning device connected to the image-forming apparatus main unit 100A or from a host device, e.g., a personal computer communicatively connected to the image-forming apparatus main unit 100A.

The image-forming apparatus 100 has, as a plurality of image-forming members, a first, second, third, and fourth image-forming members SY, SM, SC, and SK for forming an image in each of the colors yellow (Y), magenta (M), cyan (C), and black (K), respectively.

The constitution and operation of the first to fourth image-forming members SY, SM, SC, and SK are substantially the same, except the colors of the images formed are different. Accordingly, in those instances where a specific distinction need not be made, an overall description is provided and the suffixes Y, M, C, and K, which are assigned to a reference sign in order to indicate that a component is used for a particular color, have been omitted.

The image-forming apparatus 100 has, as a plurality of image bearing members, four drum-shaped electrophotographic photosensitive members provided side-by-side in the direction that intersects the vertical direction, i.e., has photosensitive drums 1. The photosensitive drum 1 is rotatably driven by a drive means (drive source) (not shown) in the direction shown by the arrow A in the diagram (clockwise direction). The following are disposed on the circumference of the photosensitive drum 1: a charging roller 2, as a charging means, that uniformly charges the surface of the photosensitive drum 1; and a scanner unit (photoexposure device) 3, as a photoexposure means, that irradiates a laser based on image information and forms an electrostatic image (electrostatic latent image) on the photosensitive drum 1.

The following are also disposed on the circumference of the photosensitive drum 1: a developing unit (developing apparatus) 4, as a development means, that develops the electrostatic image as a toner image; and a cleaning member 6, as a cleaning means, that removes the toner (untransferred toner) that remains on the surface of the photosensitive drum 1 after transfer. Also provided, as an intermediate transfer member facing the four photosensitive drums 1, is an intermediate transfer belt 5 for transferring the toner image on the photosensitive drum 1 to the recording material 12.

The developing unit 4 has toner as a developer. In addition, the developing unit 4 carries out reverse development by contacting the developing roller (described below) as a toner carrying member with the photosensitive drum 1. That is, the developing unit 4 develops the electrostatic image by attaching the toner, charged to the same polarity as the charging polarity of the photosensitive drum 1 (negative polarity in this example), to those areas (image areas, photoexposed areas) where the charge on the photosensitive drum 1 has been depleted by photoexposure.

The intermediate transfer belt 5, which as an intermediate transfer member is formed as an endless belt, abuts all of the photosensitive drums 1 and engages in circular motion (rotation) in the direction of the arrow B in the diagram (counterclockwise direction). The intermediate transfer belt 5 runs over a driver roller 51, a secondary transfer opposing roller 52, and a driven roller 53 functioning as a plurality of support members.

Four primary transfer rollers 8 are disposed, as primary transfer means, on the inner circumference side of the intermediate transfer belt 5, in a row and facing the respective photosensitive drums 1. A primary transfer roller 8 presses the intermediate transfer belt 5 toward the photosensitive drum 1 to form a primary transfer region N1 in which the intermediate transfer belt 5 abuts the photosensitive drum 1.

A bias with a polarity reversed from the regular charging polarity of the toner is applied to the primary transfer roller 8 from a primary transfer bias power source (high-voltage power source) (not shown) as a primary transfer bias application means. This functions to transfer the toner image on the photosensitive drum 1 onto the intermediate transfer belt 5.

A secondary transfer roller 9 is disposed as a secondary transfer means on the outer circumference side of the intermediate transfer belt 5 and in a position opposite from the secondary transfer opposing roller 52. The secondary transfer roller 9 presses against the secondary transfer opposing roller 52 with the intermediate transfer belt 5 disposed therebetween, to form a secondary transfer region N2 at which the intermediate transfer belt 5 abuts the secondary transfer roller 9. In addition, a bias with a reverse polarity from the regular charging polarity of the toner is applied to the secondary transfer roller 9 from a secondary transfer bias power source (high-voltage power source) (not shown) serving as a secondary transfer bias application means. This functions to transfer (secondary transfer) the toner image on the intermediate transfer belt 5 to the recording material 12.

Continuing the description, when image formation is carried out, the surface of the photosensitive drum 1 is first uniformly charged by the charging roller 2. The surface of the charged photosensitive drum 1 is then subjected to scanning exposure by laser light in correspondence to the image information generated from the scanner unit 3, thus forming on the photosensitive drum 1 an electrostatic image that corresponds to the image information.

The electrostatic image formed on the photosensitive drum 1 is then developed into a toner image by the developing unit 4. The toner image formed on the photosensitive drum 1 is transferred (primary transfer) by the action of the primary transfer roller 8 onto the intermediate transfer belt 5.

For example, when a full-color image is to be formed, this process is performed in sequence at the first through fourth image-forming members SY, SM, SC, and SK and the toner images for each color undergo primary transfer with sequential stacking onto the intermediate transfer belt 5.

After this, the recording material 12 is transported to the secondary transfer region N2 in synchronization with the movement of the intermediate transfer belt 5. The four-color toner image on the intermediate transfer belt 5 undergoes secondary transfer all at once onto the recording material 12 under the action of the secondary transfer roller 9, which abuts the intermediate transfer belt 5 with the recording material 12 disposed therebetween.

The recording material 12, with the toner image transferred thereto, is transported to the fixing apparatus 10, which functions as a fixing means. The toner image is fixed to the recording material 12 through the application of heat and pressure to the recording material 12 at the fixing apparatus 10.

In addition, after the primary transfer step, the primary untransferred toner remaining on the photosensitive drum 1 is removed by the cleaning member 6 and is recovered. The secondary untransferred toner remaining on the intermediate transfer belt 5 after the secondary transfer step is cleaned off by the intermediate transfer belt cleaning apparatus 11.

The image-forming apparatus 100 may also be configured to form a monochrome image or a multicolor image through the use of only a single desired image-forming member or through the use of only several (but not all) of the image-forming members.

Construction of Process Cartridge

The overall construction of the process cartridge 7 installed in the image-forming apparatus 100 is described in the following. The construction and operation of the process cartridge 7 are substantially the same for each color, with the exception of the type of toner (color) filled therein.

FIG. 2 is a schematic cross-sectional (main cross section) diagram of a process cartridge 7 viewed along the length direction (rotational axis direction) of the photosensitive drum 1. The attitude of the process cartridge 7 in FIG. 2 is the attitude for the state as installed in the main unit of the image-forming apparatus, and explanations in the following with regard to the positional relationships of the members of the process cartridge, directions, and so forth, refer to the positional relationships, directions, and so forth for this attitude.

The process cartridge 7 is constructed by the integration into a single article of a photosensitive member unit 13, which is provided with a photosensitive drum 1 and so forth, and a developing unit 4, which is provided with a developing roller 17 and so forth.

The photosensitive member unit 13 has a cleaning frame 14 that functions as a frame that supports various components in the photosensitive member unit 13. A photosensitive drum 1 is rotatably installed via a bearing (not shown) in the cleaning frame 14. Through the transmission to the photosensitive member unit 13 of a drive force from a drive motor (not shown) functioning as a drive means (drive source), the photosensitive drum 1 is rotatably driven in the direction of the arrow A in the diagram (clockwise direction) in correspondence to the image-formation operation.

A cleaning member 6 and a charging roller 2 are disposed in the photosensitive member unit 13 so as to contact the peripheral surface of the photosensitive drum 1. The untransferred toner removed from the surface of the photosensitive drum 1 by the cleaning member 6 falls into the cleaning frame 14 and is held there.

The charging roller 2, which is a charging means, is rotatably driven by the pressurized contact of the conductive rubber roller part with the photosensitive drum 1.

Here, a prescribed direct-current voltage versus the photosensitive drum 1 is applied as a charging step to the metal core of the charging roller 2, and this causes the formation of a uniform dark potential (Vd) at the surface of the photosensitive drum 1. A laser light spot pattern emitted in correspondence to the image data by laser light from the aforementioned scanner unit 3 is irradiated onto the photosensitive drum 1, and, in those locations undergoing irradiation, the surface charge is dissipated by carriers from the carrier generation layer and the potential declines. As a result, an electrostatic latent image, of irradiated regions having a prescribed light potential (Vl) and nonirradiated regions having a prescribed dark potential (Vd), is formed on the photosensitive drum 1.

The developing unit 4, on the other hand, has a developing roller 17, functioning as a toner carrying member for carrying the toner 80, and has a developing compartment, in which there is disposed a toner feed roller 20 functioning as a feed member that feeds the toner to the developing roller 17. The developing unit 4 is also provided with a toner holder 18.

The toner feed roller 20 rotates while forming an abutting region N with the developing roller 17. In FIG. 2, the toner feed roller 20 and the developing roller 17 rotate in directions wherein their respective surfaces move from the top to the bottom of the abutting region N; however, the toner feed roller 20 may assume either rotation direction.

A stirring transport member 22 is disposed in the toner holder 18. The stirring transport member 22 stirs the toner held in the toner holder 18 and transports the toner in the direction of the arrow G in the diagram toward the upper part of the toner feed roller 20.

The developing blade 21 is disposed beneath the developing roller 17 and counter-abuts the developing roller and carries out charge provision and regulation of the coating amount for the toner fed by the toner feed roller 20.

The developing roller 17 and the photosensitive drum 1 respectively rotate such that their respective surfaces move in the same direction in their facing region.

In order to carry out injection charging on the toner 80, preferably, for example, a potential difference is also established between the developing blade 21 and the developing roller 17. By doing this, charge is injected from the developing blade to the toner carried on the developing roller and precision control of the charge quantity on the toner can be achieved.

The methods used to measure the various properties are more particularly described in the following.

Methods for Calculating Toner Perimeter Length D, $W_{all}$, $C_{all}$, and $C_{Mall}$ The toner cross section is observed using the following method and a transmission electron microscope (TEM).

The toner is first thoroughly dispersed in a normal temperature-curable epoxy resin followed by curing for 2 days in a 40° C. atmosphere.

50 nm-thick thin section samples are sliced from the resulting cured material using a microtome equipped with a diamond blade (EM UC7, Leica).

The toner cross section is observed by enlarging this sample by 500,000× using a TEM (Model JEM2800, JEOL Ltd.) and conditions of an acceleration voltage of 200 V and an electron beam probe size of 1 mm. At this time, toner cross sections are selected that have a largest diameter that is 0.9- to 1.1-times the number-average particle diameter (D1) provided by measurement of the same toner using the method described below for measuring the number-average particle diameter (D1) of the toner.

The constituent elements of the obtained toner cross sections are analyzed using energy-dispersive x-ray spectroscopy (EDX) and EDX mapping images (256×256 pixels (2.2 nm/pixel), number of scans=200) are produced.

When, in the resulting EDX mapping image, a signal deriving from the element silicon is observed at the toner base particle surface and this signal is confirmed by the Method for Confirming Organosilicon Polymer, see below, to derive from organosilicon polymer, this signal is then taken to be an organosilicon polymer image. In addition, when the organosilicon polymer image is continuously observed at the toner base particle surface, the base line is taken to be the line segment that connects the end points of the organosilicon polymer image to each other at the toner base particle surface. The end point of the organosilicon polymer image is the region where the intensity of the silicon-originating signal becomes equal to the background silicon intensity.

For each base line, the perpendicular line having the longest length is selected from the perpendicular lines running from the base line to the surface of the organosilicon polymer image, and this longest length is taken to be the image height H. A "protruded portion A" is an image containing the organosilicon polymer and polyhydric acid metal salt, for which this image height H is from 30 nm to 300 nm.

The protruded portion is preferably present in the EDX mapping image in a semicircular shape. This semicircular shape may be any shape having a curved line close to a semicircular shape and includes approximately semicircular shapes. For example, semi-true circular shapes and semi-elliptical shapes are also included. The semicircular shape includes semicircular shapes provided by sectioning with a straight line that passes through the center of the circle, i.e., half-circle shapes. The semicircular shape also includes semicircular shapes provided by sectioning with a straight line that does not pass through the center of the circle, i.e., shapes larger than a half circle and shapes smaller than a half circle.

Referring to the base line of the protruded portion as the protrusion base line, the length of the protrusion base line is measured to give the protrusion width W. When a plurality of protruded portions are observed, the protrusion width W is measured for each protruded portion and the total of the protrusion widths W in one toner particle is taken to be $W_{all}$ (nm). The length of the perimeter of the toner base particle is measured at the same time and this is taken to be the toner perimeter length D (nm).

When a signal originating with metal is observed at the surface of a protruded portion and a polyhydric acid metal salt is detected at the toner surface by Method for Detecting Polyhydric Acid Metal Salt described below, this signal is taken to be a polyhydric acid metal salt image. The length of the periphery of the protruded portion is then measured to give the protrusion peripheral length C (nm). The length of the segments where the polyhydric acid metal salt image is observed in the periphery of the protruded portion is designated $C_M$ (nm). The protrusion peripheral length C and $C_M$ are measured for each protruded portion in one toner particle and these are summed to give, respectively, $C_{all}$ and $C_{Mall}$.

Twenty toner cross sections are analyzed using these methods; $W_{all}$, D, $C_{all}$, and $C_{Mall}$ are determined for each toner; and the arithmetic average values for the twenty are calculated.

Method for Confirming Organosilicon Polymer

Confirmation of the organosilicon polymer at the toner particle surface is carried out by comparing the ratio between the element contents (atomic %) for Si and O (Si/O ratio) with a standard.

EDX analysis is performed, using the conditions described in the Methods for Calculating the Toner Perimeter Length D, $W_{all}$, $C_{all}$, and $C_{Mall}$, on standards for the organosilicon polymer and silica fine particles, respectively, and the element contents (atomic %) for each of Si and O are obtained.

The Si/O ratio for the organosilicon polymer is designated A, and the Si/O ratio for the silica fine particles is designated B. Measurement conditions are selected whereby A is significantly larger than B.

Specifically, the measurement is carried out ten times on each standard under the same conditions, and A and B and their respective arithmetic averages are obtained. Measurement conditions are selected whereby the obtained average values provide A/B>1.1.

When the Si/O ratio for a region where silicon is detected—as observed in the toner cross section observed in the analysis for the Methods for Calculating the Toner Perimeter Length D, $W_{all}$, $C_{all}$, and $C_{Mall}$—is on the A side from [(A+B)/2], such a region is scored as organosilicon polymer.

Tospearl 120A (Momentive Performance Materials Japan LLC) is used as the standard for organosilicon polymer particles, and HDK V15 (Asahi Kasei Corporation) is used as the standard for silica fine particles.

Method for Detecting Polyhydric Acid Metal Salt

The polyhydric acid metal salt at the toner surface is detected using the following method and time-of-flight secondary ion mass spectrometry (TOF-SIMS).

The toner sample is analyzed using the following conditions and TOF-SIMS (TRIFT IV, Ulvac-Phi, Inc.).

Primary ion species: gold ion ($Au^+$)

Primary ion current value: 2 pA

Analyzed area: 300×300 $\mu m^2$

Number of pixels: 256×256 pixels

Analysis time: 3 min

Repetition frequency: 8.2 kHz

Charge neutralization: ON

Secondary ion polarity: positive

Secondary ion mass range: m/z 0.5 to 1850

Sample substrate: indium

Polyhydric acid metal salt is scored as being present at the toner surface when, in analysis under the aforementioned conditions, a peak originating with a secondary ion containing the metal ion and polyhydric acid ion is detected (for example, in the case of titanium phosphate, $TiPO_3$ (m/z 127), $TiP_2O_5$ (m/z 207), and so forth).

Method for Calculating Ratios M1, M2, and M3 of Metal Element M, Using X-Ray Photoelectron Spectroscopy Treatment (a)

A 61.5 mass % aqueous sucrose solution is prepared by adding 160 g of sucrose (Kishida Chemical Co., Ltd.) to 100 mL of deionized water and dissolving while heating on a water bath. 31.0 g of this aqueous sucrose solution and 6.0 g of Contaminon N (product name) (a 10 mass % aqueous solution of a neutral pH 7 detergent for cleaning precision measurement instrumentation, comprising a nonionic surfactant, anionic surfactant, and organic builder, Wako Pure Chemical Industries, Ltd.) are introduced into a centrifugal separation tube (50 mL) and a dispersion is prepared.

1.0 g of the toner is added to this dispersion and toner lumps are broken up using, for example, a spatula. The centrifugal separation tube is shaken for 20 minutes at an amplitude of 4 cm at 300 spm (strokes per min) using a shaker (AS-1N from AS ONE Corporation) equipped with a Universal Shaker Option Centrifuge Tube Holder (AS ONE Corporation).

After shaking, the solution is transferred to a glass tube (50 mL) for swing rotor service and separation is performed using a centrifugal separator and conditions of 3500 rpm and 30 minutes. The occurrence of satisfactory separation between the toner and aqueous solution is visually checked, and the toner separated into the uppermost layer is recovered with, for example, a spatula. The recovered toner is filtered on a reduced-pressure filtration apparatus and is then dried for at least 1 hour in a dryer. The dried product is broken up with a spatula to obtain the toner (a).

Treatment (b)

31.0 g of the aforementioned aqueous sucrose solution and 6.0 g of Contaminon N are introduced into a centrifugal separation tube and a dispersion is prepared. To this dispersion is added 1.0 g of toner on which treatment (a) has been carried out, and the toner lumps are broken up with, for example, a spatula. Ultrasound at an electrical output of 120 W is applied for 10 minutes to the centrifugal separation tube using a VP-050 from the TAITEC Corporation.

After the ultrasound treatment, the solution is transferred to a glass tube (50 mL) for swing rotor service and separation is performed using a centrifugal separator and conditions of 3500 rpm and 30 minutes. The occurrence of satisfactory separation between the ultrasound-treated toner and aqueous solution is visually checked, and the toner separated into the uppermost layer is recovered with, for example, a spatula. The recovered toner is filtered on a reduced-pressure filtration apparatus and is then dried for at least 1 hour in a dryer. The dried product is broken up with a spatula to obtain the toner (b).

M1, M2, and M3 are determined by carrying out the following measurement using the toner, toner (a), and toner (b) and x-ray photoelectron spectroscopy.

The ratios M1, M2, and M3 for the metal element M are determined by measuring the indicated toners using the following conditions.

Measurement instrumentation: Quantum 2000 (Ulvac-Phi, Incorporated) x-ray photoelectron spectrometer X-ray source: monochrome Al Kα

X-ray setting: 100 μmØ (25 W (15 kV))

Photoelectron take-off angle: 45°

Neutralizing conditions: use of both neutralizing gun and ion gun

Analysis region: 300×200 μm

Pass energy: 58.70 eV

Step size: 0.125 eV

Analysis software: MultiPack (PHI)

The use of Ti as the metal element is taken up as an example in the following, and the determination method by analysis of the quantitative value for the metal element is described. First, the peak originating with the C—C bond of the carbon 1 s orbital is corrected to 285 eV. Then, using the relative sensitivity factor provided by Ulvac-Phi, Inc., the amount of Ti originating with the element Ti is calculated with reference to the total amount of the constituent elements using the peak area originating with the Ti 2p orbital, for which the peak top is detected at 452 to 468 eV, and this value is used as the quantitative value M1 (atomic %) for the element Ti at the toner surface.

The toner, toner (a), and toner (b) are measured using this method and the ratio of the metal element M at the surface of each toner is determined from the obtained spectra to give M1 (atomic %), M2 (atomic %), and M3 (atomic %), respectively.

Method for Calculating Mass Ratios Si1, Si2, and Si3 for Organosilicon Polymer Using Fluorescent X-Ray Analysis Si1, Si2, and Si3 are determined by carrying out the following measurement using the toner, toner (a), and toner (b) and fluorescent x-ray analysis.

Measurement of the x-ray fluorescence of the particular element is based on JIS K 0119-1969 and is specifically as follows.

An "Axios" wavelength-dispersive x-ray fluorescence analyzer (PANalytical B.V.) is used as the measurement instrumentation, and the "SuperQ ver. 4.0F" (PANalytical B.V.) software provided with the instrument is used in order to set the measurement conditions and analyze the measurement data. Rh is used for the x-ray tube anode; a vacuum is used for the measurement atmosphere; the measurement diameter (collimator mask diameter) is 10 mm; and the measurement time is 10 seconds. Detection is carried out with a proportional counter (PC) in the case of measurement of light elements, and with a scintillation counter (SC) in the case of measurement of heavy elements.

1 g of the toner is introduced into a specialized aluminum compaction ring with a diameter of 10 mm and is smoothed over, and, using a "BRE-32" tablet compression molder (Maekawa Testing Machine Mfg. Co., Ltd.), a pellet is produced by molding to a thickness of 2 mm by compression for 60 seconds at 20 MPa, and this pellet is used as the measurement sample.

The measurement is performed using the conditions indicated above and the elements are identified based on the positions of the resulting x-ray peaks; their concentrations are calculated from the count rate (unit: cps), which is the number of x-ray photons per unit time.

To quantitate, for example, the amount of silicon in the toner, for example, 0.5 mass parts of Tospearl 120A (Momentive Performance Materials Japan LLC) organosilicon polymer fine particles is added to 100 mass parts of the toner particle and thorough mixing is performed using a coffee mill. 2.0 mass parts and 5.0 mass parts of the silica fine powder are each likewise mixed with the toner particle, and these are used as samples for calibration curve construction.

For each of these samples, a pellet of the sample for calibration curve construction is fabricated proceeding as above using the tablet compression molder, and the count rate (unit: cps) is measured for the Si-Kα radiation observed at a diffraction angle (2θ)=109.08° using PET for the analyzer crystal. In this case, the acceleration voltage and current value for the x-ray generator are, respectively, 24 kV and 100 mA. A calibration curve in the form of a linear function is obtained by placing the obtained x-ray count rate on the vertical axis and the amount of $SiO_2$ addition to each calibration curve sample on the horizontal axis.

The toner to be analyzed is then made into a pellet proceeding as above using the tablet compression molder and is subjected to measurement of its Si-Kα radiation count rate. The content of the organosilicon polymer in the toner is determined from the aforementioned calibration curve.

The toner, toner (a), and toner (b) are measured using this method and the content of the organosilicon polymer for each toner is determined to give Si1 (mass %), Si2 (mass %), and Si3 (mass %), respectively.

Method for Measuring Weight-Average Particle Diameter (D4) and Number-Average Particle Diameter (D1)

The weight-average particle diameter (D4) and number-average particle diameter (D1) of the toner, toner particle, and toner base particle (also referred to below as, for example, toner) is determined proceeding as follows.

The measurement instrument used is a "Coulter Counter Multisizer 3" (registered trademark, Beckman Coulter, Inc.), a precision particle size distribution measurement instrument operating on the pore electrical resistance method and equipped with a 100-μm aperture tube.

The measurement conditions are set and the measurement data are analyzed using the accompanying dedicated software, i.e., "Beckman Coulter Multisizer 3 Version 3.51" (Beckman Coulter, Inc.). The measurements are carried out in 25,000 channels for the number of effective measurement channels.

The aqueous electrolyte solution used for the measurements is prepared by dissolving special-grade sodium chloride in deionized water to provide a concentration of 1.0% and, for example, "ISOTON II" (Beckman Coulter, Inc.) can be used.

The dedicated software is configured as follows prior to measurement and analysis.

In the "modify the standard operating method (SOMME)" screen in the dedicated software, the total count number in the control mode is set to 50,000 particles; the number of measurements is set to 1 time; and the Kd value is set to the value obtained using "standard particle 10.0 μm" (Beckman Coulter, Inc.). The threshold value and noise level are automatically set by pressing the "threshold value/noise level measurement button". In addition, the current is set to 1,600 μA; the gain is set to 2; the electrolyte solution is set to ISOTON II; and a check is entered for the "post-measurement aperture tube flush".

In the "setting conversion from pulses to particle diameter" screen of the dedicated software, the bin interval is set to logarithmic particle diameter; the particle diameter bin is set to 256 particle diameter bins; and the particle diameter range is set to 2 μm to 60 μm.

The specific measurement procedure is as follows.

(1) 200.0 mL of the aqueous electrolyte solution is introduced into a 250-mL roundbottom glass beaker intended for use with the Multisizer 3 and this is placed in the sample stand and counterclockwise stirring with the stirrer rod is carried out at 24 rotations per second. Contamination and air bubbles within the aperture tube are preliminarily removed by the "aperture tube flush" function of the dedicated software.

(2) 30.0 mL of the aqueous electrolyte solution is introduced into a 100-mL flatbottom glass beaker. To this is added as dispersing agent 0.3 mL of a dilution prepared by the three-fold (mass) dilution with deionized water of "Contaminon N" (a 10% aqueous solution of a neutral pH 7 detergent for cleaning precision measurement instrumentation, comprising a nonionic surfactant, anionic surfactant, and organic builder, from Wako Pure Chemical Industries, Ltd.).

(3) An "Ultrasonic Dispersion System Tetra 150" (Nikkaki Bios Co., Ltd.) is prepared; this is an ultrasound disperser with an electrical output of 120 W and is equipped with two oscillators (oscillation frequency=50 kHz) disposed such that the phases are displaced by 180°. 3.3 L of deionized water is introduced into the water tank of the ultrasound disperser and 2.0 mL of Contaminon N is added to this water tank.

(4) The beaker described in (2) is set into the beaker holder opening on the ultrasound disperser and the ultrasound disperser is started. The vertical position of the beaker is adjusted in such a manner that the resonance condition of the surface of the aqueous electrolyte solution within the beaker is at a maximum.

(5) While the aqueous electrolyte solution within the beaker set up according to (4) is being irradiated with ultrasound, 10 mg of the, e.g., toner, is added to the aqueous electrolyte solution in small aliquots and dispersion is carried out. The ultrasound dispersion treatment is continued for an additional 60 seconds. The water temperature in the water tank is controlled as appropriate during ultrasound dispersion to be from 10° C. to 40° C.

(6) Using a pipette, the aqueous electrolyte solution prepared in (5) and containing, e.g., dispersed toner, is dripped into the roundbottom beaker set in the sample stand as described in (1) with adjustment to provide a measurement concentration of 5%. Measurement is then performed until the number of measured particles reaches 50,000.

(7) The measurement data is analyzed by the previously cited dedicated software provided with the instrument and the weight-average particle diameter (D4) and the number-average particle diameter (D1) are calculated. When set to graph/volume % with the dedicated software, the "average diameter" on the "analysis/volumetric statistical value (arithmetic average)" screen is the weight-average particle diameter (D4). When set to graph/number % with the dedicated software, the "average diameter" on the "analysis/numerical statistical value (arithmetic average)" screen is the number-average particle diameter (D1).

Measurement of Volume Resistivity of Polyhydric Acid Metal Salt

The volume resistivity of the polyhydric acid metal salt is measured as follows.

A Model 6430 Sub-Femtoamp Remote SourceMeter (Keithley Instruments) is used as the instrumentation. An SH2-Z 4-probe measurement-enabling sample holder (Bio-Logic) is connected to the FORCE terminal of this instrument; 0.20 g of the metal compound is loaded in the electrode section; and the distance between the electrodes is measured with a load of 123.7 kgf applied using a torque wrench.

The resistance is measured after the application of a voltage of 20 V for 1 minute to the sample, and the volume resistivity is calculated using the following formula.

$$\text{Volume resistivity } (\Omega\cdot\text{cm}) = R \times S/L$$

(R: resistance value (Ω), L: distance between electrodes (cm), S: electrode area ($cm^2$))

Identification of Organosilicon Polymer Substructures by NMR

The following method is used to confirm the structure represented by formula (I) in the organosilicon polymer contained in the toner particle.

The hydrocarbon group represented by R in formula (I) is checked using $^{13}C$-NMR.

Measurement Conditions for $^{13}C$-NMR (Solid State)
Instrument: JNM-ECX500II, JEOL RESONANCE
Sample tube: 3.2 mmØ
Sample: tetrahydrofuran-insoluble matter of the toner particle for NMR measurement, 150 mg
Measurement temperature: room temperature
Pulse mode: CP/MAS
Measurement nucleus frequency: 123.25 MHz ($^{13}C$)
Reference substance: adamantane (external reference: 29.5 ppm)
Sample spinning rate: 20 kHz
Contact time: 2 ms
Delay time: 2 s
Number of scans: 1024

The hydrocarbon group represented by R in formula (1) was confirmed by this method through the presence/absence of a signal originating with, for example, a silicon atom-bonded methyl group ($Si—CH_3$), ethyl group ($Si—C_2H_5$), propyl group ($Si—C_3H_7$), butyl group ($Si—C_4H_9$), pentyl group ($Si—C_5H_{11}$), hexyl group ($Si—C_6H_{13}$), or phenyl group ($Si—C_6H_5$).

Measurement of Acid Value of Resin

The acid value is the number of milligrams of potassium hydroxide required to neutralize the acid present in 1 g of a sample. The acid value of the binder resin is measured in accordance with JIS K 0070-1992, and is specifically measured using the following procedure.

(1) Reagent Preparation

A phenolphthalein solution is obtained by dissolving 1.0 g of phenolphthalein in 90 mL of ethyl alcohol (95 volume %) and bringing to 100 mL by adding deionized water.

7 g of special-grade potassium hydroxide is dissolved in 5 mL of water and this is brought to 1 L by the addition of ethyl alcohol (95 volume %). This is introduced into an alkali-resistant container avoiding contact with, for example, carbon dioxide, and allowed to stand for 3 days. Standing is followed by filtration to obtain a potassium hydroxide solution. The obtained potassium hydroxide solution is stored in an alkali-resistant container.

The factor for this potassium hydroxide solution is determined from the amount of the potassium hydroxide solution required for neutralization when 25 mL of 0.1 mol/L hydrochloric acid is introduced into an Erlenmeyer flask, several drops of the aforementioned phenolphthalein solution are added, and titration is performed using the potassium hydroxide solution. The 0.1 mol/L hydrochloric acid is prepared in accordance with JIS K 8001-1998.

(2) Procedure (A) Main Test

A 2.0 g sample of pulverized binder resin is exactly weighed into a 200-mL Erlenmeyer flask and 100 mL of a toluene/ethanol (2:1) mixed solution is added and dissolution is carried out over 5 hours. Several drops of the phenolphthalein solution are added as indicator and titration is performed using the potassium hydroxide solution. The titration endpoint is taken to be the persistence of the faint pink color of the indicator for 30 seconds.

(B) Blank Test

The same titration as in the above procedure is run, but without using the sample (that is, with only the toluene/ethanol (2:1) mixed solution).

(3) The acid value is calculated by substituting the obtained results into the following formula.

$$A=[(C-B)\times f\times 5.61]/S$$

Here, A: acid value (mg KOH/g); B: amount (mL) of addition of the potassium hydroxide solution in the blank test; C: amount (mL) of addition of the potassium hydroxide solution in the main test; f: factor for the potassium hydroxide solution; and S: mass of the sample (g).

EXAMPLES

The present invention is more specifically described in the examples provided below. However, these in no way limit the present invention. Unless specifically indicated otherwise, the "parts" and "%" in the formulations in the examples and comparative examples are on a mass basis in all instances.

Toner Base Particle Dispersion Production Example

Toner Base Particle Dispersion 1

11.2 parts of sodium phosphate (dodecahydrate) was introduced into 390.0 parts of deionized water in a reactor and the temperature was held at 65° C. for 1.0 hour while purging with nitrogen. Stirring was begun at 12000 rpm using a T. K. Homomixer (Tokushu Kika Kogyo Co., Ltd.). While maintaining the stirring, an aqueous calcium chloride solution of 7.4 parts of calcium chloride (dihydrate) dissolved in 10.0 parts of deionized water was introduced all at once into the reactor to prepare an aqueous medium containing a dispersion stabilizer. 1.0 mol/L hydrochloric acid was introduced into the aqueous medium in the reactor to adjust the pH to 6.0, thus yielding aqueous medium 1.

Preparation of Polymerizable Monomer Composition

| | |
|---|---|
| styrene | 60.0 parts |
| C.I. Pigment Blue 15:3 | 6.3 parts |

These materials were introduced into an attritor (Nippon Coke & Engineering Co., Ltd.) and dispersion was carried out for 5.0 hours at 220 rpm using zirconia particles with a diameter of 1.7 mm to prepare a colorant dispersion in which the pigment was dispersed.

The following materials were then added to this colorant dispersion.

| | |
|---|---|
| styrene | 10.0 parts |
| n-butyl acrylate | 30.0 parts |
| polyester resin | 5.0 parts |
| (condensation polymer of terephthalic acid and the 2 mol adduct of propylene oxide on bisphenol A, weight-average molecular weight Mw = 10000, acid value = 8.2 mg KOH/g) | |
| HNP9 (melting point: 76° C., Nippon Seiro Co., Ltd.) | 6.0 parts |

This material was then held at 65° C. and a polymerizable monomer composition was prepared by dissolving and dispersing to uniformity at 500 rpm using a T. K. Homomixer.

Granulation Step

While holding the temperature of aqueous medium 1 at 70° C. and the stirrer rotation rate at 12500 rpm, the polymerizable monomer composition was introduced into the aqueous medium 1 and 8.0 parts of the polymerization initiator t-butyl peroxypivalate was added. Granulation was performed for 10 minutes while maintaining 12500 rpm with the stirrer.

Polymerization Step

The high-speed stirrer was replaced with a stirrer equipped with a propeller impeller and polymerization was carried out for 5.0 hours while maintaining 70° C. and stirring at 200 rpm; the temperature was then raised to 85° C. and a polymerization reaction was run by heating for 2.0 hours. The residual monomer was removed by raising the temperature to 98° C. and heating for 3.0 hours, and deionized water was added to adjust the toner base particle concentration in the dispersion to 30.0 mass %, thus yielding toner base particle dispersion 1 in which toner base particle 1 was dispersed.

Toner base particle 1 had a number-average particle diameter (D1) of 6.2 μm and a weight-average particle diameter (D4) of 6.9 μm.

Toner Base Particle Dispersion 2

The following materials were weighed out and mixed and dissolved.

| | |
|---|---|
| styrene | 70.0 parts |
| n-butyl acrylate | 25.1 parts |
| acrylic acid | 1.3 parts |
| hexanediol diacrylate | 0.4 parts |
| n-lauryl mercaptan | 3.2 parts |

A 10 mass % aqueous solution of Neogen RK (Dai-ichi Kogyo Seiyaku Co., Ltd.) was added to this solution and dispersion was carried out. While gently stirring for 10 minutes, an aqueous solution of 0.15 parts of potassium persulfate dissolved in 10.0 parts of deionized water was also added.

Nitrogen substitution was performed followed by emulsion polymerization for 6.0 hours at a temperature of 70° C. After completion of the polymerization, the reaction solution was cooled to room temperature and deionized water was added to obtain a resin particle dispersion having a solids concentration of 12.5 mass % and a number-average particle diameter of 0.2 μm.

The following materials were weighed out and mixed.

| | |
|---|---|
| ester wax (melting point: 70° C.) | 100.0 parts |
| Neogen RK | 17.0 parts |
| deionized water | 385.0 parts |

A wax particle dispersion was obtained by dispersion for 1 hour using a JN100 wet jet mill (Jokoh Co., Ltd.). The solids concentration in this wax particle dispersion was 20.0 mass %.

The following materials were weighed out and mixed.

| | |
|---|---|
| C.I. Pigment Blue 15:3 | 63.0 parts |
| Neogen RK | 17.0 parts |
| deionized water | 920.0 parts |

A colorant particle dispersion was obtained by dispersion for 1 hour using a JN100 wet jet mill (Jokoh Co., Ltd.). The solids concentration in this colorant particle dispersion was 10.0 mass %.

| | |
|---|---|
| resin particle dispersion | 160.0 parts |
| wax particle dispersion | 10.0 parts |
| colorant particle dispersion | 18.9 parts |
| magnesium sulfate | 0.3 parts |

These materials were dispersed using a homogenizer (IKA), followed by heating to 65° C. while stirring. After stirring for 1.0 hour at 65° C., observation with an optical microscope confirmed the formation of aggregate particles having a number-average particle diameter of 6.0 μm. After the addition of 2.5 parts of Neogen RK (Dai-ichi Kogyo Seiyaku Co., Ltd.), the temperature was raised to 80° C. and stirring was performed for 2.0 hours to obtain coalesced colored resin particles.

The solid obtained by cooling and then filtration and separation was washed by stirring for 1.0 hour in 720.0 parts of deionized water. This colored resin-containing dispersion was filtered followed by drying to yield toner base particle 2.

Toner base particle 2 had a number-average particle diameter (D1) of 6.2 μm and a weight-average particle diameter (D4) of 7.5 μm. The resin particle dispersion was also separately dried to solidification to recover the resin; measurement of the acid value yielded an acid value of 15.2 mg KOH/g.

11.2 parts of sodium phosphate (dodecahydrate) was introduced into 390.0 parts of deionized water in a reactor, and this was held for 1.0 hour at 65° C. while purging with nitrogen.

An aqueous calcium chloride solution of 7.4 parts of calcium chloride (dihydrate) dissolved in 10.0 parts of deionized water was introduced all at once while stirring at 12500 rpm using a T. K. Homomixer (Tokushu Kika Kogyo Co., Ltd.) to prepare an aqueous medium containing a dispersion stabilizer. 1.0 mol/L hydrochloric acid was introduced into the aqueous medium in the reactor to adjust the pH to 6.0 and provide aqueous medium 2.

100.0 parts of toner base particle 2 was introduced into aqueous medium 2 and dispersion was carried out for 30 minutes while stirring at 5000 rpm and a temperature of 60° C. using a T. K. Homomixer. Deionized water was added to adjust the solids concentration of toner base particle 2 in the dispersion to 30.0 mass %, thus providing toner base particle dispersion 2.

Toner Base Particle Dispersion 3

| | |
|---|---|
| binder resin = styrene-n-butyl acrylate copolymer: (styrene: n-butyl acrylate copolymerization ratio = 70:30, Mp = 22000, Mw = 35000, Mw/Mn = 2.4) | 100.0 parts |
| C.I. Pigment Blue 15:3 | 6.3 parts |
| amorphous polyester resin: (condensate of terephthalic acid and propylene oxide-modified bisphenol A, Mw = 7800, Tg = 70° C., acid value = 8.0 mg KOH/g) | 5.0 parts |
| Fischer-Tropsch wax (melting point: 78° C.): | 5.0 parts |

These materials were pre-mixed using an FM mixer (Nippon Coke & Engineering Co., Ltd.) followed by melt-kneading with a twin-screw kneader (Model PCM-30, Ikegai Ironworks Corporation) to obtain a kneaded material. The obtained kneaded material was cooled and coarsely pulverized using a hammer mill (Hosokawa Micron Corporation) and then pulverized using a mechanical pulverizer (T-250, Turbo Kogyo Co., Ltd.) to obtain a finely pulverized powder. The obtained finely pulverized powder was classified using a Coanda effect-based multi-grade classifier (Model EJ-L-3, Nittetsu Mining Co., Ltd.) to obtain toner base particle 3.

Toner base particle 3 had a number-average particle diameter (D1) of 5.2 μm and a weight-average particle diameter (D4) of 6.7 μm.

11.2 parts of sodium phosphate (dodecahydrate) was introduced into 390.0 parts of deionized water in a reactor, and this was held for 1.0 hour at 65° C. while purging with nitrogen.

Stirring was carried out at 12500 rpm using a T. K. Homomixer (Tokushu Kika Kogyo Co., Ltd.). While maintaining the stirring, an aqueous calcium chloride solution of 7.4 parts of calcium chloride (dihydrate) dissolved in 10.0 parts of deionized water was introduced all at once into the reactor to prepare an aqueous medium containing a dispersion stabilizer. 1.0 mol/L hydrochloric acid was introduced into the aqueous medium in the reactor to adjust the pH to 6.0 and provide aqueous medium 3.

200.0 parts of toner base particle 3 was introduced into aqueous medium 3 and dispersion was carried out for 30 minutes while stirring at 5000 rpm and a temperature of 60° C. using a T. K. Homomixer. Deionized water was added to adjust the toner particle concentration in the dispersion to 30.0 mass %, thus providing toner base particle dispersion 3.

Toner Base Particle Dispersion 4

| | |
|---|---|
| binder resin = styrene-n-butyl acrylate copolymer: (styrene: n-butyl acrylate copolymerization ratio = 70:30, Mp = 22000, Mw = 35000, Mw/Mn = 2.4) | 100.0 parts |
| C.I. Pigment Blue 15:3 | 6.3 parts |
| Fischer-Tropsch wax (melting point: 78° C.): | 5.0 parts |

These materials were pre-mixed using an FM mixer (Nippon Coke & Engineering Co., Ltd.) followed by melt-kneading with a twin-screw kneader (Model PCM-30, Ikegai Ironworks Corporation) to obtain a kneaded material. The obtained kneaded material was cooled and coarsely pulverized using a hammer mill (Hosokawa Micron Corporation) and then pulverized using a mechanical pulverizer (T-250, Turbo Kogyo Co., Ltd.) to obtain a finely pulverized powder. The obtained finely pulverized powder was classified using a Coanda effect-based multi-grade classifier (Model EJ-L-3, Nittetsu Mining Co., Ltd.) to obtain toner base particle 4.

Toner base particle 4 had a number-average particle diameter (D1) of 5.1 μm and a weight-average particle diameter (D4) of 6.6 μm. The aforementioned binder resin did not exhibit an acid value when it was subjected to measurement of the acid value.

11.2 parts of sodium phosphate (dodecahydrate) was introduced into 390.0 parts of deionized water in a reactor, and this was held for 1.0 hour at 65° C. while purging with nitrogen.

Stirring was carried out at 12500 rpm using a T. K. Homomixer (Tokushu Kika Kogyo Co., Ltd.). While maintaining the stirring, an aqueous calcium chloride solution of 7.4 parts of calcium chloride (dihydrate) dissolved in 10.0 parts of deionized water was introduced all at once into the reactor to prepare an aqueous medium containing a dispersion stabilizer. 1.0 mol/L hydrochloric acid was introduced into the aqueous medium in the reactor to adjust the pH to 6.0 and provide aqueous medium 4.

200.0 parts of toner base particle 4 was introduced into aqueous medium 4 and dispersion was carried out for 30 minutes while stirring at 5000 rpm and a temperature of 60° C. using a T. K. Homomixer. Deionized water was added to adjust the toner particle concentration in the dispersion to 30.0 mass %, thus providing toner base particle dispersion 4.

Organosilicon Compound Solution Production Example

| | |
|---|---|
| deionized water | 70.0 parts |
| methyltriethoxysilane | 30.0 parts |

These materials were weighed into a 200-mL beaker and the pH was adjusted to 3.5 using 10 mass % hydrochloric acid. This was followed by stirring for 1.0 hour while heating to 60° C. on a water bath to produce an organosilicon compound solution 1.

Organosilicon compound solutions 2 to 4 were produced using the same procedure and changing the type of organosilicon compound and adjusted pH as shown in Table 1.

TABLE 1

| | Chemical name | Abbreviation | Formula (II) structure | pH |
|---|---|---|---|---|
| Organosilicon compound solution 1 | Methyl-triethoxysilane | MTES | Y | 3.5 |
| Organosilicon compound solution 2 | Vinyl-trimethoxysilane | VTMS | Y | 3.0 |
| Organosilicon compound solution 3 | Tetra-ethoxysilane | TEOS | N | 4.0 |
| Organosilicon compound solution 4 | Dimethyl-dimethoxysilane | DMDMS | N | 3.5 |

(In the "formula (II) structure" column in Table 1, Y indicates that a formula (II) structure is present and N indicates that a formula (II) structure is not present)

Production Example for Polyhydric Acid Metal Salt Fine Particles Polyhydric Acid Metal Salt Fine Particle 1

| | |
|---|---|
| deionized water | 100.0 parts |
| sodium phosphate (dodecahydrate) | 8.5 parts |

The preceding were mixed and 60.0 parts of ammonium zirconium lactate (ZC-300, Matsumoto Fine Chemical Co., Ltd.) (corresponds to 7.2 parts as ammonium zirconium lactate) was then added while stirring at 10000 rpm using a T. K. Homomixer (Tokushu Kika Kogyo Co., Ltd.). The pH was adjusted to 7.0 by the addition of 1 mol/L hydrochloric acid. The temperature was adjusted to 25° C. and a reaction was run for 1 hour while maintaining the stirring.

The solids fraction was subsequently recovered by centrifugal separation. Ions such as sodium and so forth were removed by then carrying out the following sequence three times: redispersion in deionized water and recovery of the solids fraction by centrifugal separation. This was followed by redispersion in deionized water and drying by spray drying to obtain fine particles of a zirconium phosphate compound having a number-average particle diameter of 124 nm.

Polyhydric Acid Metal Salt Fine Particles 2 to 4

Polyhydric acid metal salt fine particles 2 to 4 were produced proceeding as in the production example for polyhydric acid metal salt fine particle 1, but changing the materials used in the production example for polyhydric acid metal salt fine particle 1 to the materials indicated in Table 2.

Polyhydric Acid Metal Salt Attachment Step

| | |
|---|---|
| 44% aqueous titanium lactate solution (TC-310, Matsumoto Fine Chemical Co., Ltd.) | 3.2 parts (corresponds to 1.4 parts as titanium lactate) |
| organosilicon compound solution 1 | 10.0 parts |

These samples were then weighed out and mixed in the reactor; the pH of the obtained mixture was subsequently adjusted to 9.5 using a 1 mol/L aqueous NaOH solution; and holding was carried out for 4.0 hours. After dropping the temperature to 25° C., the pH was adjusted to 1.5 using 1 mol/L hydrochloric acid; stirring was performed for 1.0 hour; and filtration was subsequently carried out while washing with deionized water to obtain toner particle 1.

Upon observation of toner particle 1 by TEM-EDX, protruded portions containing an organosilicon polymer and a polyhydric acid metal salt were observed at the toner base particle surface and the presence of titanium at the protruded portion surface was observed. In addition, an ion derived from a titanium phosphate compound was detected in analysis of toner particle 1 by TOF-SIMS.

This titanium phosphate compound is the reaction product of the titanium lactate with phosphate ion deriving from the sodium phosphate or calcium phosphate in the toner base particle dispersion 1.

Toner Particles 2 to 19

Toner particles 2 to 19 were obtained as in the production example for toner particle 1 by changing the production conditions as indicated in Table 3.

TABLE 2

| | Reaction temperature | Polyhydric acid source | Parts | Metal source | Parts | Polyhydric acid metal salt | Number-average particle diameter (nm) |
|---|---|---|---|---|---|---|---|
| Polyhydric acid metal salt fine particle 1 | 25° C. | Sodium phosphate (dodecahydrate) | 8.5 | Ammonium zirconium lactate | 7.2 | Zirconium phosphate | 124 |
| Polyhydric acid metal salt fine particle 2 | 70° C. | Sodium phosphate (dodecahydrate) | 8.5 | Ammonium zirconium lactate | 7.2 | Zirconium phosphate | 22 |
| Polyhydric acid metal salt fine particle 3 | 70° C. | Sodium phosphate (dodecahydrate) | 11.2 | Calcium chloride | 7.4 | Calcium phosphate | 21 |
| Polyhydric acid metal salt fine particle 4 | 70° C. | Sodium oxalate | 8.0 | Titanium lactate | 10.4 | Titanium oxalate | 24 |

Toner Particle Production Example

Toner Particle 1

Protrusion Formation Step

The following samples were weighed into a reactor and mixed using a propeller impeller.

| | |
|---|---|
| toner base particle dispersion 1 | 500.0 parts |
| organosilicon compound solution 1 | 35.0 parts |

The pH of the resulting mixture was then adjusted to 6.0 using a 1 mol/L aqueous NaOH solution and the temperature of the mixture was brought to 50° C. and holding was subsequently carried out for 1.0 hour while mixing using a propeller impeller (protrusion formation step 1). The pH of the mixture was subsequently adjusted to 9.5 using a 1 mol/L aqueous NaOH solution and holding was carried out for 1.0 hour (protrusion formation step 2).

Upon observation of toner particles 2 to 19 by TEM-EDX, protruded portions containing an organosilicon polymer and a polyhydric acid metal salt were observed at the toner base particle surface and the presence of a metal element attached to the protruded portion surface was observed. In addition, an ion derived from the particular polyhydric acid metal salt indicated in Table 4 was detected in analysis of toner particles 2 to 19 by TOF-SIMS.

Toner Particle 20

Protrusion Formation Step

The following samples were weighed into a reactor and mixed using a propeller impeller.

| | |
|---|---|
| organosilicon compound solution 2 | 20.0 parts |
| silica fine particles (produced by the water glass method: number-average particle diameter = 80 nm) | 3.0 parts |
| toner base particle dispersion 1 | 500.0 parts |

Then, while mixing using a propeller impeller, the pH of the mixture was adjusted to 6.0 and the temperature was then raised to 70° C. and holding was carried out for 1.0 hour (protrusion formation step 1). The pH was subsequently adjusted to 9.5 using a 1.0 mol/L aqueous NaOH solution and holding was carried out for 1.0 hour while stirring (protrusion formation step 2).

Polyhydric Acid Metal Salt Attachment Step

| | |
|---|---|
| polyhydric acid metal salt fine particle 2 | 3.0 parts |
| organosilicon compound solution 2 | 5.0 parts |

These samples were then weighed out and mixed in the reactor; the pH of the obtained mixture was then adjusted to 9.5 using a 1 mol/L aqueous NaOH solution; and holding was carried out for 4.0 hours. After dropping the temperature to 25° C., the pH was adjusted to 1.5 using 10 mass % hydrochloric acid; stirring was performed for 1.0 hour; and filtration was subsequently carried out while washing with deionized water to obtain toner particle 20.

The following were observed upon TEM-EDX observation of toner particle 20: protruded portions were formed on the toner base particle surface due to the embedding of organosilicon polymer-coated silica particles in the toner base particle, and zirconium was present at the surface of these protruded portions. In addition, an ion originating with a zirconium phosphate compound was detected in TOF-SIMS analysis of toner particle 20.

Toner Particle 21

Protrusion Formation Step

The following samples were weighed into a reactor and mixed using a propeller impeller.

| | |
|---|---|
| organosilicon compound solution 2 | 20.0 parts |
| silica fine particles (produced by the water glass method: number-average particle diameter = 80 nm) | 3.0 parts |
| toner base particle dispersion 1 | 500.0 parts |

Then, while mixing using a propeller impeller, the pH of the mixture was adjusted to 6.0 and the temperature was then raised to 70° C. and holding was carried out for 1.0 hour (protrusion formation step 1). The pH was subsequently adjusted to 9.5 using a 1.0 mol/L aqueous NaOH solution and holding was carried out for 1.0 hour while stirring (protrusion formation step 2). The pH was adjusted to 1.5 using 10% hydrochloric acid and stirring was carried out for 1.0 hour, followed by filtration while washing with deionized water to obtain toner particle precursor 1.

Polyhydric Acid Metal Salt Attachment Step

The following samples were weighed into a reactor and mixed using a propeller impeller.

| | |
|---|---|
| deionized water | 350.0 parts |
| polyhydric acid metal salt fine particle 3 | 3.0 parts |

The following samples were then introduced into the reactor while continuing to stir.

| | |
|---|---|
| organosilicon compound solution 2 | 5.0 parts |
| toner particle precursor 1 | 150.0 parts |

The pH of the mixture was then adjusted to 9.5 while mixing using a propeller impeller, and the temperature was subsequently raised to 70° C. and holding was carried out for 4.0 hours. Filtration was then carried out while washing with deionized water to obtain toner particle 21.

The following were observed upon TEM-EDX observation of toner particle 21: protruded portions were formed on the toner base particle surface due to the embedding of organosilicon polymer-coated silica particles in the toner base particle, and calcium was present at the surface of these protruded portions. In addition, an ion originating with a calcium phosphate compound was detected in TOF-SIMS analysis of toner particle 21.

Toner Particle 22

Toner particle 22 was obtained proceeding as in the production example for toner particle 20, but using polyhydric acid metal salt fine particle 4 in place of polyhydric acid metal salt fine particle 2 in the production example for toner particle 20.

The following were observed upon TEM-EDX observation of toner particle 22: protruded portions were formed on the toner base particle surface due to the embedding of organosilicon polymer-coated silica particles in the toner base particle, and titanium was present at the surface of these protruded portions. In addition, an ion originating with a titanium oxalate compound was detected in TOF-SIMS analysis of toner particle 22.

Toner Particle 23

Polyhydric Acid Metal Salt Attachment Step 1

The following samples were weighed into a reactor and mixed using a propeller impeller.

| | |
|---|---|
| toner base particle dispersion 1 | 500.0 parts |
| 44% aqueous titanium lactate solution (TC-310, Matsumoto Fine Chemical Co., Ltd.) | 2.0 parts (corresponds to 0.9 parts as titanium lactate) |
| organosilicon compound solution 1 | 5.0 parts |

The pH of the mixture was subsequently adjusted to 9.5 using a 1 mol/L aqueous NaOH solution and the temperature of the mixture was brought to 50° C. and holding was then carried out for 1.0 hour while mixing using a propeller impeller.

Protrusion Formation Step

The following samples were weighed into the reactor and mixed using a propeller impeller.

organosilicon compound solution 1 35.0 parts

The pH of the resulting mixture was then re-adjusted to 9.5 using a 1 mol/L aqueous NaOH solution and the temperature of the mixture was brought to 50° C. and holding was subsequently carried out for 2.0 hours while mixing using a propeller impeller.

Polyhydric Acid Metal Salt Attachment Step 2

| | |
|---|---|
| 44% aqueous titanium lactate solution (TC-310, Matsumoto Fine Chemical Co., Ltd.) | 2.0 parts (corresponds to 0.9 parts as titanium lactate) |
| organosilicon compound solution 1 | 5.0 parts |

These samples were then weighed out and mixed in the reactor; the pH of the obtained mixture was subsequently re-adjusted to 9.5 using a 1 mol/L aqueous NaOH solution; and holding was carried out for 4.0 hours. After dropping the temperature to 25° C., the pH was adjusted to 1.5 using 1 mol/L hydrochloric acid; stirring was performed for 1.0 hour; and filtration was subsequently carried out while washing with deionized water to obtain toner particle 23.

Upon observation of toner particle 23 by TEM-EDX, protruded portions containing an organosilicon polymer and a polyhydric acid metal salt were observed at the toner base particle surface and the presence of titanium at the protruded portion surface was observed. In addition, an ion derived from a titanium phosphate compound was detected in analysis of toner particle 23 by TOF-SIMS.

This titanium phosphate compound is the reaction product of the titanium lactate with phosphate ion deriving from the sodium phosphate or calcium phosphate in the toner base particle dispersion 1.

Toner Particle 24

Toner base particle 1 as such was used as toner particle 24.

Toner Particle 25

The following samples were weighed into a reactor and mixed using a propeller impeller.

| | |
|---|---|
| organosilicon compound solution 1 | 30.0 parts |
| aluminum oxide fine particles (number-average particle diameter = 15 nm) | 3.0 parts |
| silica fine particles (produced by the water glass method: number-average particle diameter = 80 nm) | 3.0 parts |
| toner base particle dispersion 1 | 500.0 parts |

Then, while mixing using a propeller impeller, the pH of the mixture was adjusted to 5.5 and the temperature was then raised to 70° C. and holding was carried out for 3.0 hours. The pH was subsequently adjusted to 9.5 using a 1.0 mol/L aqueous NaOH solution and holding was carried out for 2.0 hours while stirring. The pH was adjusted to 1.5 using 10 mass % hydrochloric acid and stirring was carried out for 1.0 hour, followed by filtration while washing with deionized water to obtain toner particle 25.

The following were observed upon TEM-EDX observation of toner particle 25: protruded portions were formed on the toner base particle surface due to the embedding of organosilicon polymer-coated silica particles in the toner base particle, and aluminum was present at the surface of these protruded portions. In addition, an ion deriving from a polyhydric acid metal salt was not detected in TOF-SIMS analysis of toner particle 25.

Toner Particle 26

The following samples were weighed into a reactor and mixed using a propeller impeller.

| | |
|---|---|
| methanol | 590.0 parts |
| toner base particle 1 | 100.0 parts |

The following materials were added to this and additional mixing was carried out.

| | |
|---|---|
| tetraethoxysilane | 50.0 parts |
| tetraethoxytitanium | 50.0 parts |
| methyltriethoxysilane | 30.0 parts |
| methanol | 400.0 parts |

This dispersion was then added dropwise to a mixture of 10000.0 parts of methanol and 1000.0 parts of an aqueous ammonium hydroxide solution having a 28 mass % concentration and stirring was carried out for 48 hours at room temperature. Filtration was then performed while washing with purified water, and washing with methanol was carried out to obtain toner particle 26.

Aggregates containing silicon and titanium had formed at the toner particle surface according to TEM-EDX observation of toner 26. In addition, an ion deriving from a polyhydric acid metal salt was not detected in analysis of toner particle 26 using TOF-SIMS.

Toner Particle 27

The following samples were weighed into a reactor and mixed using a propeller impeller.

| | |
|---|---|
| toner base particle dispersion 1 | 500.0 parts |
| organosilicon compound solution 2 | 35.0 parts |

The pH of the resulting mixture was then adjusted to 9.5 using a 1 mol/L aqueous NaOH solution and the temperature of the mixture was brought to 50° C. and holding was subsequently carried out for 5.0 hours while mixing using a propeller impeller.

| | |
|---|---|
| methanol | 20.0 parts |
| isopropyl triisostearoyl titanate (titanate coupling agent) | 5.0 parts |

The temperature was dropped to 25° C.; a mixture of the preceding materials was subsequently added dropwise at a rate of 5 mL/min; and stirring was continued in this condition for 2.0 hours. The temperature was then raised to 60° C. while stirring and stirring was continued for an additional 2.0 hours while holding at 60° C. Cooling to 25° C. was subsequently carried out and solid-liquid separation was performed using suction filtration. Vacuum drying was then continued for 12 hours to provide a toner particle 27, the surface of which was coated with the titanate coupling agent.

Upon observation of toner particle 27 by TEM-EDX, protruded portions containing an organosilicon polymer were observed at the toner base particle surface, and titanium was present at the surface of these protruded portions. In addition, an ion derived from a polyhydric acid metal salt was not detected in analysis of toner particle 27 by TOF-SIMS.

Toner Particle 28

Polyhydric Acid Metal Salt Attachment Step

The following samples were weighed into a reactor and mixed using a propeller impeller.

| | |
|---|---|
| toner base particle dispersion 1 | 500.0 parts |
| polyhydric acid metal salt fine particle 2 | 3.0 parts |
| organosilicon compound solution 2 | 5.0 parts |

Then, while mixing using a propeller impeller, the pH of the mixture was adjusted to 6.0 and the temperature was then raised to 70° C. and holding was carried out for 1.0 hour. The pH was subsequently adjusted to 9.5 using a 1.0 mol/L aqueous NaOH solution and holding was carried out for 5.0 hours while stirring. After dropping the temperature to 25°

C., the pH was adjusted to 1.5 using 10 mass % hydrochloric acid and stirring was carried out for 1.0 hour, followed by filtration while washing with deionized water to obtain toner particle 28.

The presence of protruded portions could not be detected by TEM-EDX observation of toner particle 28. In addition, the presence of zirconium at the toner particle surface was observed. An ion deriving from a zirconium phosphate compound was detected in TOF-SIMS analysis of toner particle 28.

Toner Production Methods

Toners 1 to 23 and 25 to 28

Toner particles 1 to 23 were used as toners 1 to 23. Toner particles 25 to 28 were used as toners 25 to 28.

Toner 24

| | |
|---|---|
| toner particle 24 | 100.0 parts |
| hydrophobic silica fine particles (treated with hexamethyldisilazane, number-average particle diameter = 12 nm) | 0.8 parts |
| polyhydric acid metal salt fine particle 1 | 0.2 parts |

These materials were introduced into a SUPERMIXER PICCOLO SMP-2 (Kawata Mfg. Co., Ltd.) and mixing was performed for 10 minutes at 3000 rpm. This was followed by sieving on a mesh with an aperture of 150 μm to obtain toner 24.

The properties of toners 1 to 28 are given in Table 4.

TABLE 3

| Toner | Toner base particle dispersion | Protrusion formation step: Organosilicon compound solution | | Protrusion formation step: Protrusion formation step 1 | Protrusion formation step: Protrusion formation step 2 | Polyhydric acid metal salt attachment step: Organosilicon compound solution | | Polyhydric acid metal salt attachment step: Metal source | | |
|---|---|---|---|---|---|---|---|---|---|---|
| No. | No. | No. | Parts | pH | pH | No. | Parts | Type | Parts | pH |
| 1 | 1 | 1 | 35.0 | 6.0 | 9.5 | 1 | 10.0 | Titanium lactate | 1.4 | 9.5 |
| 2 | 1 | 1 | 50.0 | 4.5 | 9.5 | 1 | 15.0 | Titanium lactate | 1.4 | 9.5 |
| 3 | 1 | 1 | 45.0 | 4.5 | 9.5 | 1 | 15.0 | Titanium lactate | 1.4 | 9.5 |
| 4 | 1 | 1 | 35.0 | 7.0 | 9.5 | 1 | 5.0 | Titanium lactate | 1.4 | 9.5 |
| 5 | 1 | 1 | 30.0 | 7.0 | 9.5 | 1 | 5.0 | Titanium lactate | 1.4 | 9.5 |
| 6 | 1 | 2 | 35.0 | 6.0 | 9.5 | 2 | 10.0 | Titanium lactate | 2.3 | 9.5 |
| 7 | 1 | 2 | 35.0 | 6.0 | 9.5 | 2 | 10.0 | Titanium lactate | 1.9 | 9.5 |
| 8 | 1 | 2 | 35.0 | 6.0 | 9.5 | 2 | 10.0 | Titanium lactate | 0.5 | 9.5 |
| 9 | 1 | 2 | 35.0 | 6.0 | 9.5 | 2 | 10.0 | Titanium lactate | 0.2 | 9.5 |
| 10 | 1 | 2 | 35.0 | 6.0 | 9.5 | 2 | 5.0 | Titanium lactate | 1.4 | 9.5 |
| 11 | 1 | 2 | 35.0 | 6.0 | 9.5 | 2 | 1.0 | Titanium lactate | 1.4 | 9.5 |
| 12 | 1 | 2 | 35.0 | 6.0 | 9.5 | 2 | 1.0 | Ammonium zirconium lactate | 1.4 | 9.5 |
| 13 | 1 | 2 | 35.0 | 6.0 | 9.5 | 2 | 1.0 | Aluminum lactate | 1.4 | 9.5 |
| 14 | 1 | 2 | 35.0 | 6.0 | 9.5 | 2 | 1.0 | Copper lactate | 1.4 | 9.5 |
| 15 | 2 | 2 | 35.0 | 6.0 | 9.5 | 2 | 1.0 | Titanium lactate | 1.4 | 9.5 |
| 16 | 3 | 2 | 35.0 | 6.0 | 9.5 | 2 | 1.0 | Titanium lactate | 1.4 | 9.5 |
| 17 | 4 | 2 | 35.0 | 6.0 | 9.5 | 2 | 1.0 | Titanium lactate | 1.4 | 9.5 |
| 18 | 1 | 2/3 | 25/10 | 6.0 | 9.5 | 2 | 1.0 | Titanium lactate | 1.4 | 9.5 |
| 19 | 1 | 3/4 | 10/25 | 6.0 | 9.5 | 2 | 1.0 | Titanium lactate | 1.4 | 9.5 |
| 20 | 1 | 2 | 20.0 | 6.0 | 9.5 | 2 | 5.0 | Polyhydric acid metal salt fine particle 2 | 3.0 | 9.5 |
| 21 | 1 | 2 | 20.0 | 6.0 | 9.5 | 2 | 5.0 | Polyhydric acid metal salt fine particle 3 | 3.0 | 9.5 |
| 22 | 1 | 2 | 20.0 | 6.0 | 9.5 | 2 | 5.0 | Polyhydric acid metal salt fine particle 4 | 3.0 | 9.5 |
| 23 | 1 | 1 | 35.0 | 9.5 | — | 1 | 10.0 | Titanium lactate | 1.8 | 9.5 |
| 24 | 1 | Described in Specification | | | | | | | | |
| 25 | 1 | Described in Specification | | | | | | | | |
| 26 | 1 | Described in Specification | | | | | | | | |
| 27 | 1 | Described in Specification | | | | | | | | |
| 28 | 1 | — | — | — | — | 2 | 5.0 | Polyhydric acid metal salt fine particle 2 | 3.0 | 9.5 |

(In Table 3, the entries for toner 23 in the polyhydric acid metal salt attachment step represent the sum for the polyhydric acid metal salt attachment step 1 and the polyhydric acid metal salt attachment step 2. In addition, the use of a "/" to split numbers in the column for the No. of the organosilicon compound solution indicates that both are used, and the numerical values split by the "/" in the column for the number of parts indicates the respective amounts of introduction.)

TABLE 4

| Toner No. | Polyhydric acid metal salt | Protruded portion | $W_{all}$/D | $C_{Mall}$/$C_{all}$ | M1 | M2 | M3 | M2/M1 |
|---|---|---|---|---|---|---|---|---|
| 1 | Ti phosphate | Y | 0.59 | 0.28 | 3.31% | 3.28% | 3.15% | 0.99 |
| 2 | Ti phosphate | Y | 0.95 | 0.27 | 2.72% | 2.69% | 2.59% | 0.99 |
| 3 | Ti phosphate | Y | 0.90 | 0.27 | 2.98% | 2.95% | 2.83% | 0.99 |
| 4 | Ti phosphate | Y | 0.30 | 0.29 | 3.37% | 3.34% | 3.00% | 0.99 |
| 5 | Ti phosphate | Y | 0.25 | 0.29 | 4.02% | 3.98% | 3.58% | 0.99 |
| 6 | Ti phosphate | Y | 0.61 | 0.55 | 13.15% | 13.02% | 12.50% | 0.99 |
| 7 | Ti phosphate | Y | 0.60 | 0.46 | 9.76% | 9.66% | 9.28% | 0.99 |
| 8 | Ti phosphate | Y | 0.61 | 0.09 | 1.10% | 1.09% | 1.05% | 0.99 |
| 9 | Ti phosphate | Y | 0.59 | 0.04 | 0.24% | 0.24% | 0.23% | 1.00 |
| 10 | Ti phosphate | Y | 0.59 | 0.28 | 3.28% | 3.25% | 3.02% | 0.99 |
| 11 | Ti phosphate | Y | 0.55 | 0.29 | 3.36% | 3.33% | 2.99% | 0.99 |
| 12 | Zr phosphate | Y | 0.56 | 0.24 | 2.46% | 2.44% | 2.19% | 0.99 |
| 13 | Al phosphate | Y | 0.55 | 0.23 | 2.38% | 2.36% | 2.12% | 0.99 |
| 14 | Cu phosphate | Y | 0.51 | 0.22 | 2.03% | 2.01% | 1.81% | 0.99 |
| 15 | Ti phosphate | Y | 0.52 | 0.28 | 2.95% | 2.92% | 2.63% | 0.99 |
| 16 | Ti phosphate | Y | 0.53 | 0.28 | 3.10% | 3.07% | 2.76% | 0.99 |
| 17 | Ti phosphate | Y | 0.52 | 0.29 | 3.28% | 3.25% | 2.92% | 0.99 |
| 18 | Ti phosphate | Y | 0.52 | 0.30 | 3.67% | 3.49% | 3.03% | 0.95 |
| 19 | Ti phosphate | Y | 0.50 | 0.27 | 3.12% | 2.56% | 1.92% | 0.82 |
| 20 | Zr phosphate | Y | 0.60 | 0.09 | 1.76% | 1.65% | 1.34% | 0.94 |
| 21 | Ca phosphate | Y | 0.52 | 0.09 | 1.79% | 1.64% | 1.31% | 0.92 |
| 22 | Ti oxalate | Y | 0.51 | 0.09 | 1.81% | 1.62% | 1.26% | 0.90 |
| 23 | Ti phosphate | Y | 0.42 | 0.28 | 3.45% | 3.42% | 3.28% | 0.99 |
| 24 | Zr phosphate | N | — | — | 0.22% | 0.11% | 0.04% | 0.50 |
| 25 | None | Y | 0.60 | — | — | — | — | — |
| 26 | None | N | — | — | — | — | — | — |
| 27 | None | Y | 0.60 | — | — | — | — | — |
| 28 | Zr phosphate | N | — | — | 1.73% | 1.64% | 1.32% | 0.95 |

| Toner No. | M3/M2 | Si1 | Si2 | Si3 | Si2/Si1 | SI3/Si2 | Volume resistivity Ω · cm | Structure with formula (I) |
|---|---|---|---|---|---|---|---|---|
| 1 | 0.96 | 2.73% | 2.70% | 2.65% | 0.99 | 0.98 | 9.0.E+07 | Y |
| 2 | 0.96 | 3.98% | 3.94% | 3.86% | 0.99 | 0.98 | 9.0.E+07 | Y |
| 3 | 0.96 | 3.44% | 3.41% | 3.34% | 0.99 | 0.98 | 9.0.E+07 | Y |
| 4 | 0.90 | 2.71% | 2.68% | 2.47% | 0.99 | 0.92 | 9.0.E+07 | Y |
| 5 | 0.90 | 2.30% | 2.28% | 2.09% | 0.99 | 0.92 | 9.0.E+07 | Y |
| 6 | 0.96 | 2.69% | 2.66% | 2.61% | 0.99 | 0.98 | 9.0.E+07 | Y |
| 7 | 0.96 | 2.64% | 2.61% | 2.56% | 0.99 | 0.98 | 9.0.E+07 | Y |
| 8 | 0.96 | 2.83% | 2.80% | 2.75% | 0.99 | 0.98 | 9.0.E+07 | Y |
| 9 | 0.96 | 2.68% | 2.65% | 2.60% | 0.99 | 0.98 | 9.0.E+07 | Y |
| 10 | 0.93 | 2.43% | 2.41% | 2.29% | 0.99 | 0.95 | 9.0.E+07 | Y |
| 11 | 0.90 | 2.13% | 2.11% | 1.94% | 0.99 | 0.92 | 9.0.E+07 | Y |
| 12 | 0.90 | 2.10% | 2.08% | 1.91% | 0.99 | 0.92 | 6.9.E+07 | Y |
| 13 | 0.90 | 2.24% | 2.22% | 2.04% | 0.99 | 0.92 | 4.7.E+08 | Y |
| 14 | 0.90 | 2.08% | 2.06% | 1.89% | 0.99 | 0.92 | 2.9.E+08 | Y |
| 15 | 0.90 | 2.16% | 2.14% | 1.97% | 0.99 | 0.92 | 9.0.E+07 | Y |
| 16 | 0.90 | 2.18% | 2.16% | 1.99% | 0.99 | 0.92 | 9.0.E+07 | Y |
| 17 | 0.90 | 2.06% | 2.04% | 1.88% | 0.99 | 0.92 | 9.0.E+07 | Y |
| 18 | 0.87 | 2.33% | 2.24% | 1.97% | 0.96 | 0.88 | 9.0.E+07 | Y |
| 19 | 0.75 | 2.22% | 1.95% | 1.56% | 0.88 | 0.80 | 9.0.E+07 | N |
| 20 | 0.81 | 2.11% | 2.09% | 1.92% | 0.99 | 0.92 | 6.9.E+07 | Y |
| 21 | 0.80 | 2.08% | 2.06% | 1.89% | 0.99 | 0.92 | 4.2.E+08 | Y |
| 22 | 0.78 | 2.13% | 2.11% | 1.94% | 0.99 | 0.92 | 5.7.E+08 | Y |
| 23 | 0.96 | 2.72% | 2.70% | 2.65% | 0.99 | 0.98 | 9.0.E+07 | Y |
| 24 | 0.36 | — | — | — | — | — | 6.9.E+07 | — |
| 25 | — | 2.52% | 2.49% | 2.30% | 0.99 | 0.92 | — | Y |
| 26 | — | 2.57% | 2.18% | 1.70% | 0.85 | 0.78 | — | — |
| 27 | — | 2.08% | 2.00% | 1.76% | 0.96 | 0.88 | — | Y |
| 28 | 0.80 | — | — | — | — | — | 6.9.E+07 | — |

In the table, "Y" in the protruded portion column indicates that protruded portions containing an organosilicon polymer and a polyhydric acid metal salt were observed on the toner base particle surface, while "N" indicates that such protrusions were not observed. The unit for M1, M2, and M3 is atomic %, and the unit for Si1, Si2, and Si3 is mass %. The volume resistivity gives the volume resistivity of the polyhydric acid metal salt. With regard to the volume resistivity, the use, for example, of "9.0.E+07" indicates "$9.0\times10^{7}$".

In addition, "Y" in the column for the structure with formula (I) indicates that the organosilicon polymer in the protruded portions had a structure with formula (I), while "N" indicates that the organosilicon polymer in the protruded portions did not have a structure with formula (I).

Examples 1 to 23 and Comparative Examples 1 to 5

Evaluations in the combinations shown in Table 5 were performed using toners 1 to 28. The results of the evaluations are given in Table 5.

The evaluation methods and evaluation criteria are described in the following.

An LBP-712Ci (Canon, Inc.), which is a commercial laser printer, was modified for use as the image-forming apparatus. The machine was modified so any potential difference could be set between the charging blade and charging roller when connected to an external high-voltage power source and was modified to have a process speed of 200 mm/sec. A 040H toner cartridge (cyan) (Canon, Inc.), which is a commercial process cartridge, was used.

The production toner was removed from within the cartridge and, after cleaning with an air blower, 165 g of the toner to be evaluated was introduced. The production toner at each of the yellow, magenta, and black stations was removed, and the evaluations were performed with the yellow, magenta, and black cartridges installed, but with the remaining toner amount detection mechanism inactivated.

1. Evaluation of Injected Charge Quantity

2. Evaluation of Injected Charge Quantity Distribution

The aforementioned process cartridge and modified laser printer and the evaluation paper (GF-C081 (Canon, Inc.), A4, 81.4 g/$m^2$) were held for 48 hours in a normal-temperature, normal-humidity environment (23° C./50% RH, referred to in the following as the N/N environment).

The potential difference between the charging blade and charging roller was first set to 0 V and an all-white image was output. The machine was stopped during image formation and the process cartridge was removed from the unit and the charge quantity and charge quantity distribution were evaluated on the toner on the developing roller using a charge quantity distribution analyzer (E-spart Analyzer Model EST-1, Hosokawa Micron Corporation).

The potential difference between the charging blade and charging roller was then set to −400 V and the same evaluation was performed.

The injected charge quantity and the injected charge quantity distribution were evaluated from the change in the charge quantity ΔQ/M and the change in the charge quantity distribution between the potential difference of 0 V and the potential difference of −400 V.

Injected Charge Quantity

A: ΔQ/M is at least 20 μC/g

B: ΔQ/M is at least 10 μC/g, but less than 20 μC/g

C: ΔQ/M is at least 5 μC/g, but less than 10 μC/g

D: ΔQ/M is less than 5 μC/g

Injected Charge Amount Distribution

A: the charge quantity distribution was substantially sharper at −400 V than at 0 V B: the charge quantity distribution was sharper at −400 V than at 0 V C: the charge quantity distribution was somewhat sharper at −400 V than at 0 V D: no change in the charge quantity distribution between −400 V and 0 V was observed 3. Evaluation of Environmental Stability The aforementioned process cartridge and the aforementioned modified laser printer and the evaluation paper (GF-C081 (Canon, Inc.), A4, 81.4 g/$m^2$) were held for 48 hours in a high-temperature, high-humidity environment (30° C./80% RH, referred to in the following as the H/H environment).

The potential difference between the charging blade and charging roller was set to −400 V and an all-white image was output. The machine was stopped during image formation and the process cartridge was removed from the unit and the charge quantity and charge quantity distribution were evaluated on the toner on the developing roller using a charge quantity distribution analyzer (E-spart Analyzer Model EST-1, Hosokawa Micron Corporation).

The environmental stability of the charge quantity was evaluated by comparison with the aforementioned results from the evaluation in the N/N environment.

Environmental Stability

A: the change in the charge quantity is not more than 3 μC/g in comparison to the results in the N/N environment B: the change in the charge quantity is more than 3 μC/g and not more than 6 μC/g in comparison to the results in the N/N environment C: the change in the charge quantity is more than 6 μC/g and not more than 10 μC/g in comparison to the results in the N/N environment D: the change in the charge quantity is more than 10 μC/g in comparison to the results in the N/N environment 4. Evaluation of Durability After the aforementioned evaluation of the injected charge quantity and injected charge quantity distribution, the potential difference between the charging blade and charging roller was set to −200 V and 15000 prints were continuously output in the N/N environment on the evaluation paper of an image having a print percentage of 1.0%.

After standing for 48 hours in the same environment, the potential difference between the charging blade and charging roller was set to −400 V and an all-white image was output. The machine was stopped during image formation and the process cartridge was removed from the unit and the charge quantity and charge quantity distribution were evaluated on the toner on the developing roller using a charge quantity distribution analyzer (E-spart Analyzer Model EST-1, Hosokawa Micron Corporation).

Durability

A: the change in the charge quantity is not more than 3 μC/g in comparison to the results before the durability test B: the change in the charge quantity is more than 3 μC/g and not more than 6 μC/g in comparison to the results before the durability test C: the change in the charge quantity is more than 6 μC/g and not more than 10 μC/g in comparison to the results before the durability test D: the change in the charge quantity is more than 10 μC/g in comparison to the results before the durability test 5. Evaluation of Storability The aforementioned process cartridge was allowed to stand for 30 days in a 40° C./95% RH environment. The process cartridge was then removed and allowed to stand for 48 hours in the NN environment, and the potential difference between the charging blade and charging roller was subsequently set to −400 V and an all-white image was output. The machine was stopped during image formation and the process cartridge was removed from the unit and the charge quantity and charge quantity distribution were evaluated on the toner on the developing roller using a charge quantity distribution analyzer (E-spart Analyzer Model EST-1, Hosokawa Micron Corporation).

Storability

A: the change in the charge quantity is not more than 3 μC/g in comparison to the results before standing B: the change in the charge quantity is more than 3 μC/g and not more than 6 μC/g in comparison to the results before standing C: the change in the charge quantity is more than 6 μC/g and not more than 10 μC/g in comparison to the results before standing D: the change in the charge quantity is more than 10 μC/g in comparison to the results before standing 6. Evaluation of Image Stickiness After the aforementioned evaluation of the injected charge quantity and injected charge quantity distribution, the process speed was changed to 240 mm/sec and the potential difference between the charging blade and charging roller was set to −200 V and 2 prints were continuously output in the N/N environment on the evaluation paper of an image having a print percentage of 100.0%.

The problem of stickiness, i.e., transfer of a portion of an image to the subsequently output image, was seen only in the case of use of toners 17, 25, 26, and 27, and then only to a slight degree.

TABLE 5

| Example | Toner | Injected charge quantity: Injected charge quantity at -400 V | | | Charge quantity distribution | Environmental stability | | Durability | | Storability | | Image |
|---|---|---|---|---|---|---|---|---|---|---|---|---|
| No. | No. | μC/g | ΔQ/M | rank | rank | value | rank | value | rank | value | rank | stickiness |
| 1 | 1 | 48 | 24 | A | A | 2 | A | 2 | A | 2 | A | None |
| 2 | 2 | 43 | 18 | B | B | 2 | A | 2 | A | 2 | A | None |
| 3 | 3 | 45 | 23 | A | A | 2 | A | 2 | A | 2 | A | None |
| 4 | 4 | 45 | 23 | A | A | 2 | A | 2 | A | 2 | A | None |
| 5 | 5 | 38 | 17 | B | B | 2 | A | 3 | A | 2 | A | None |
| 6 | 6 | 35 | 18 | B | B | 2 | A | 2 | A | 2 | A | None |
| 7 | 7 | 44 | 22 | A | A | 2 | A | 2 | A | 2 | A | None |
| 8 | 8 | 46 | 23 | A | A | 2 | A | 2 | A | 2 | A | None |
| 9 | 9 | 44 | 18 | B | B | 3 | A | 3 | A | 2 | A | None |
| 10 | 10 | 45 | 22 | A | A | 2 | A | 3 | A | 2 | A | None |
| 11 | 11 | 43 | 20 | A | A | 2 | A | 3 | A | 3 | A | None |
| 12 | 12 | 38 | 21 | A | A | 3 | A | 3 | A | 3 | A | None |
| 13 | 13 | 37 | 21 | A | A | 3 | A | 3 | A | 3 | A | None |
| 14 | 14 | 32 | 16 | B | A | 3 | A | 3 | A | 3 | A | None |
| 15 | 15 | 43 | 24 | A | A | 2 | A | 3 | A | 3 | A | None |
| 16 | 16 | 42 | 21 | A | A | 3 | A | 3 | A | 3 | A | None |
| 17 | 17 | 40 | 21 | A | A | 3 | A | 3 | A | 3 | A | Yes, slight |
| 18 | 18 | 43 | 22 | A | A | 3 | A | 5 | B | 3 | A | None |
| 19 | 19 | 38 | 18 | B | B | 5 | B | 7 | C | 3 | A | None |
| 20 | 20 | 31 | 9 | C | C | 6 | B | 5 | B | 5 | B | None |
| 21 | 21 | 26 | 8 | C | C | 9 | C | 5 | B | 5 | B | None |
| 22 | 22 | 33 | 9 | C | C | 6 | B | 5 | B | 9 | C | None |
| 23 | 23 | 48 | 24 | A | A | 2 | A | 2 | A | 2 | A | None |
| C.E. 1 | 24 | 25 | 4 | D | D | 12 | D | 12 | D | 9 | C | None |
| C.E. 2 | 25 | 26 | 2 | D | D | 5 | B | 5 | B | 2 | A | Yes, slight |
| C.E. 3 | 26 | 30 | 1 | D | D | 12 | D | 11 | D | 8 | C | Yes, slight |
| C.E. 4 | 27 | 22 | 2 | D | D | 12 | D | 12 | D | 9 | C | Yes, slight |
| C.E. 5 | 28 | 26 | 2 | D | D | 5 | B | 5 | B | 2 | A | None |

In the table: "C.E." denotes "Comparative Example"; the numerical value for the evaluation of the environmental stability is the difference in charge quantity (μC/g) in comparison to the results in the N/N environment; the numerical value for the evaluation of the durability is the difference in charge quantity (μC/g) in comparison to the results prior to the durability test; and the numerical value for the evaluation of the storability is the difference in charge quantity (μC/g) in comparison to the results prior to standing.

This application is a continuation of U.S. application Ser. No. 16/935,263 filed Jul. 22, 2020, the content of which is incorporated by reference herein. Additionally, this application claims the benefit of Japanese Patent Application No. 2019-137251 filed Jul. 25, 2019, the content of which is also hereby incorporated by reference herein in its entirety.

What is claimed is:

1. A toner, comprising:

a toner particle comprising a toner base particle containing a binder resin, a surface of the toner base particle having a protruded portion, wherein the protruded portion comprises an organosilicon polymer and a polyhydric acid metal salt, and the polyhydric acid metal salt is present at a surface of the protruded portion.

2. The toner according to claim 1, wherein $0.30 \leq W_{all}/D \leq 0.90$ where in an EDX mapping image of constituent elements of a cross section of the toner obtained by analyzing the cross section of the toner observed with a transmission electron microscope using energy-dispersive x-ray spectroscopy, when an image of the toner base particle and an image of the organosilicon polymer are observed and in the toner base particle image the organosilicon polymer image is observed at a location that corresponds to the surface of the toner base particle, in the EDX mapping image, when a line segment that connects end points of an interface formed between the organosilicon polymer image and the toner base particle image to each other is designated as a base line, H (nm) is a length of a perpendicular line having a maximum length among perpendicular lines that connect the base line to a surface of the organosilicon polymer image, and protruded portion A is an organosilicon polymer image in which H is 30 to 300 nm, toner perimeter length D (nm) is a length of a perimeter of the toner base particle image, protrusion width W (nm) is a length of the base line in the protruded portion A, and $W_{all}$ (nm) is a sum of the protrusion widths W in one toner particle.

3. The toner according to claim 2, wherein an image of the polyhydric acid metal salt is observed in at least a portion of a surface of the protruded portion A in the toner cross section of the EDX mapping image, and $0.05 \leq C_{Mall}/C_{all} \leq 0.50$ when C (nm) is a peripheral length of the protruded portion A, $C_M$ (nm) is a total of a length of a portion where the polyhydric acid metal salt image is present in a periphery of one protruded portion A, $C_{all}$ (nm) is a total of the protrusion peripheral lengths C for protruded portion A in one toner particle, and $C_{Mall}$ (nm) is a total of the lengths $C_M$ in one toner particle.

4. The toner according to claim 1, wherein $0.90 \leq M2/M1$, $0.90 \leq Si2/Si1$, and M1 and M2 are independently 1.00 to 10.00, when M refers to a metal element contained in the polyhydric acid metal salt, M1 (atomic %) is a ratio of M in constituent elements of a surface of the toner determined from a spectrum obtained using x-ray photoelectron spectroscopic analysis of the toner, Si1 (mass %) is a mass ratio of the organosilicon polymer contained in the toner determined from a spectrum obtained by fluorescent x-ray analysis of the toner, M2 (atomic %) is a ratio of M in constituent elements of a surface of toner (a) determined from a spectrum obtained using x-ray photoelectron spectroscopic analysis, and Si2 (mass %) is a mass ratio of the organosilicon polymer contained in toner (a) determined from a spectrum obtained by fluorescent x-ray analysis, where toner (a) is obtained by dispersing 1.0 g of the toner in an aqueous mixed solution comprising 31.0 g of a 61.5 mass % aqueous sucrose solution and 6.0 g of a 10 mass % aqueous solution of a neutral detergent for cleaning precision measurement instrumentation comprising a nonionic surfactant, anionic surfactant and organic builder, and shaking at 300 times per minute for 20 minutes using a shaker.

5. The toner according to claim 4, wherein M3 is 1.00 to 10.00, $0.90 \leq M3/M2$ and $0.90 \leq Si3/Si2$, when M3 (atomic %) is a ratio of metal element M in constituent elements of a surface of a toner (b) treated by applying ultrasound at an electrical output of 120 W to toner (a) determined from a spectrum obtained using x-ray photoelectron spectroscopic analysis of toner (b), and Si3 (mass %) is a mass ratio of the organosilicon polymer contained in toner (b) determined from a spectrum obtained by fluorescent x-ray analysis.

6. The toner according to claim 1, wherein a volume resistivity of the polyhydric acid metal salt measured by a 4-probe method is $1.0 \times 10^5$ to $1.0 \times 10^{11}$ Ω·cm.

7. The toner according to claim 1, wherein the polyhydric acid metal salt includes a salt between a polyhydric acid and a group 3 to group 13 metal element.

8. The toner according to claim 7, wherein the metal element has a Pauling electronegativity of 1.25 to 1.85.

9. The toner according to claim 7, wherein the metal element is titanium.

10. The toner according to claim 7, wherein the polyhydric acid is inorganic.

11. The toner according to claim 10, wherein the inorganic acid is phosphoric acid.

12. The toner according to claim 1, wherein the organosilicon polymer comprises a structure according to $$R—SiO_{3/2}$$

where R is an alkyl, alkenyl, acyl, aryl, or methacryloxyalkyl group.

13. The toner according to claim 12, wherein R is a vinyl group or an alkyl group having 1 to 6 carbons.

14. The toner according to claim 1, wherein the binder resin includes a resin having an acid value.

* * * * *